US009357597B2

(12) United States Patent
Nakamura

(10) Patent No.: US 9,357,597 B2
(45) Date of Patent: May 31, 2016

(54) LIGHTING DEVICE AND VEHICLE HEADLAMP

(71) Applicant: Panasonic Corporation, Osaka (JP)

(72) Inventor: Toshiaki Nakamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 349 days.

(21) Appl. No.: 13/904,366

(22) Filed: May 29, 2013

(65) Prior Publication Data

US 2013/0320850 A1 Dec. 5, 2013

(30) Foreign Application Priority Data

Jun. 1, 2012 (JP) ................................ 2012-126596
Apr. 19, 2013 (JP) ................................ 2013-088733

(51) Int. Cl.
*B60Q 1/02* (2006.01)
*H05B 33/08* (2006.01)
*F21S 8/10* (2006.01)

(52) U.S. Cl.
CPC ......... *H05B 33/0815* (2013.01); *F21S 48/1747* (2013.01); *H05B 33/083* (2013.01)

(58) Field of Classification Search
CPC ........... H05B 33/0815; H05B 33/0827; H05B 33/0845; H05B 33/0857; H05B 33/0809; F21S 48/1747
USPC ......... 315/82, 186, 291, 294, 297, 185 R, 77, 315/307, 188
See application file for complete search history.

(56) References Cited

U.S. PATENT DOCUMENTS

| | | | | | |
|---|---|---|---|---|---|
| 7,081,708 | B2 | 7/2006 | Ito et al. | | |
| 2004/0075393 | A1 | 4/2004 | Ito et al. | | |
| 2005/0184786 | A1 | 8/2005 | Nishikawa | | |
| 2011/0068702 | A1* | 3/2011 | van de Ven | H05B 33/0854 | 315/186 |
| 2011/0127919 | A1* | 6/2011 | Lin | H05B 33/083 | 315/185 R |
| 2011/0260617 | A1* | 10/2011 | Tanaka | H05B 33/0842 | 315/82 |

FOREIGN PATENT DOCUMENTS

| | | | |
|---|---|---|---|
| EP | 2427033 | A2 | 3/2012 |
| JP | 2004-136719 | A | 5/2004 |

(Continued)

OTHER PUBLICATIONS

European Search Report issued for corresponding European Patent Application No. 13169945.6 dated Aug. 26, 2013.

*Primary Examiner* — Lincoln Donovan
*Assistant Examiner* — Thomas Skibinski
(74) *Attorney, Agent, or Firm* — Renner, Otto, Boisselle & Sklar, LLP

(57) ABSTRACT

A switching circuit includes an active element connected in parallel to a second light source block and having an impedance that varies in accordance with a control signal input into a control terminal, and switches the second light source block between a lit condition and an extinguished condition by switching the active element ON and OFF. The switching circuit adjusts the impedance of the active element so that a current flowing to the active element matches a target value set by a switching control circuit. When the active element is to be switched ON, the switching control circuit varies the target value gradually over time, and therefore an excessive load current can be prevented from flowing while the active element shifts from an OFF condition to an ON condition.

20 Claims, 18 Drawing Sheets

(56) References Cited

FOREIGN PATENT DOCUMENTS

| | | | |
|---|---|---|---|
| JP | 2008-126958 | A | 6/2008 |
| JP | 2009-134933 | A | 6/2009 |
| JP | 2010-272410 | A | 12/2010 |
| JP | 2011-100621 | | 5/2011 |
| JP | 2011-176911 | A | 9/2011 |
| JP | 2011-249377 | A | 12/2011 |
| JP | 2011-258515 | A | 12/2011 |
| JP | 2012-028184 | A | 2/2012 |
| KR | 10-2006-0043304 | A | 5/2006 |
| KR | 10-2010-0120786 | A | 11/2010 |

* cited by examiner

LIGHTING DEVICE AND VEHICLE HEADLAMP

BACKGROUND OF THE INVENTION

1. Field of the Invention

The present invention relates to a lighting device and a vehicle headlamp in which the number of light sources to be lit, from among a plurality of light sources connected in series, can be switched.

2. Description of the Related Art

In recent years, solid state light sources such as light emitting diodes (LEDs) have increased rapidly in popularity such that, for example, LEDs may even be used as vehicle headlamps in place of incandescent lamps such as halogen lamps. An LED is lit by applying a voltage exceeding a forward voltage (a barrier voltage) thereto, but since an LED has a similar load characteristic to a constant voltage load, a forward current may increase continuously when a source impedance is low, and as a result, the LED may break. As a simple solution to this problem, current limitation is performed using a current limiting resistor connected in series to the LED, but in a device requiring a comparatively large luminous flux, such as a vehicle headlamp, a current flowing to the LED is also comparatively large, and therefore a lighting device that performs constant current control using a power conversion circuit is employed.

Further, a lighting device employed in applications such as a vehicle headlamp is typically configured such that the number of light sources to be lit, from among a plurality of light sources, can be switched, thereby enabling switching between at least a driving headlamp (a high beam) and a passing headlamp (a low beam).

A device that uses a plurality of light sources connected in series and includes an active element (a switch) connected in parallel to one light source and in series to another light source is known as this type of lighting device (see Japanese Patent Application Publication No. 2004-136719 (to be referred to hereafter as "Document 1"), for example). In the lighting device described in Document 1, when one light source is not selected, or in other words only the other light source is lit, the active element is switched ON (energized) such that respective ends of the first light source are short-circuited. With the configuration described in Document 1, a part of a plurality of light sources can be lit and extinguished without providing each light source with an individual power supply circuit (a switching regulator).

With the configuration described in Document 1, incidentally, when the active element is switched ON in order to extinguish a part of the light sources, the number of light sources connected in series between output ends of a power supply circuit decreases, leading to a reduction in a required load voltage. However, a time delay occurs in the power supply circuit from a point at which the active element is switched ON to a point at which an output voltage decreases due to an effect of a capacitor provided at an output stage, for example, and as a result, an excessive current may flow to the lit light source immediately after the active element is switched ON. This excessive current may cause a solid state light source such as an LED to deteriorate or malfunction. Further, rapid load variation may cause the power supply circuit to generate unstable output such as ringing.

In response to these problems, a lighting device described in Japanese Patent Application Publication No. 2008-126958 (to be referred to hereafter as "Document 2") is configured such that a control signal of an active element (a FET) is increased gradually in accordance with a time constant of an integration circuit, thereby gradually increasing an energizing current of the active element until a light source is finally short-circuited. Further, in a lighting device described in Japanese Patent Application Publication No. 2012-28184 (to be referred to hereafter as "Document 3"), an operation to switch an active element (a switching element) for short-circuiting a light source from an open condition to a short-circuited condition and an operation to switch the active element from the short-circuited condition to the open condition are performed more slowly than an output power response operation by a power supply circuit (a DC/DC converter). With these configurations, an excessive current can be prevented from flowing to the light source when the active element is switched ON (short-circuited).

However, a transient characteristic of an active element when shifting from an OFF condition to an ON condition differs among individual active elements, and may also differ among identical active elements due to element variation and temperature characteristics. It is therefore difficult to obtain a constant operating characteristic when switching the active element ON and OFF with a configuration such as those described in Documents 2 and 3, wherein the control signal of the active element is simply slowed down.

Further, in a condition where the control signal is comparatively distant from a predetermined threshold, a typical active element operates in a region (a saturation region or a cutoff region, for example; to be referred to hereafter as a "dead zone") where an ON resistance does not vary greatly even when the control signal is varied. When the active element is maintained in the ON condition or the OFF condition, the control signal is normally maintained at a value sufficiently distant from the threshold so that the active element operates in the dead zone.

Hence, with a configuration such as those described in Documents 2 and 3, in which variation of the control signal is slowed, a certain amount of time is required to exit the dead zone, and therefore a delay occurs in a point at which the control signal reaches the threshold such that the ON/OFF condition of the active element begins to switch. The delay that occurs at this time increases steadily as a difference between the threshold and the control signal while the active element is maintained in the ON condition or the OFF condition increases. In a case where variation in the ON resistance is highly sensitive to variation in the control signal in the vicinity of the threshold of the active element (an active region), variation in the control signal must be slowed even further to ensure that the ON resistance of the active element is varied gradually, and as a result, the delay increases.

SUMMARY OF THE INVENTION

The present invention has been designed in consideration of the circumstances described above, and an object thereof is to provide a lighting device and a vehicle headlamp with which a constant operating characteristic can be obtained during a switch in an ON/OFF condition of an active element, and a delay in the start of a switch in the ON/OFF condition of the active element can be suppressed.

A lighting device according to the present invention includes: a power supply circuit that supplies a constant current to a light source group in which a first light source block and a second light source block are connected in series; and a switching circuit that includes an active element connected in parallel to the second light source block, and extinguishes the second light source block by applying a current to the active element such that the current bypasses the second light source block, wherein the active element includes a control terminal, has an impedance that can be varied in accordance with a control signal input into the control terminal, and lights the second light source block when the impedance reaches or exceeds a predetermined value, and the switching circuit includes: a control unit that controls the impedance of the active element such that a current flowing through the active element or an end-to-end voltage of the active element matches a target value; and a switching control circuit that sets the target value.

In this lighting device, the control unit preferably detects the current flowing through the active element or the end-to-end voltage of the active element as a detection value, and feedback-controls the current or the end-to-end voltage serving as the detection value by controlling the impedance of the active element such that the detection value matches the target value.

In this lighting device, when the second light source block is shifted from a lit condition to an extinguished condition, the switching control circuit preferably increases the target value of the current flowing through the active element over time at a predetermined time constant from a value thereof when the active element is OFF to a value thereof when the active element is ON, and the control unit preferably varies the impedance of the active element as the target value increases.

In this lighting device, when the second light source block is shifted from a lit condition to an extinguished condition, the switching control circuit preferably sets the target value of the current flowing through the active element at a predefined value which is larger than a load current flowing through the first light source block when the light source group is lit in a steady state and smaller than a maximum allowable current of the light source group, and the control unit preferably varies the impedance of the active element on the basis of the target value set at the predefined value.

In this lighting device, when the second light source block is shifted from the extinguished condition to the lit condition, the switching control circuit preferably reduces the target value of the current flowing through the active element over time at a predetermined time constant from the value thereof when the active element is ON to the value thereof when the active element is OFF, and the control unit preferably varies the impedance of the active element as the target value decreases.

In this lighting device, the power supply circuit preferably includes a detection unit that detects a current flowing to the light source group in order to perform constant current control, and the control unit preferably uses the current detected by the detection unit as a detection value, and feedback-controls the current serving as the detection value by controlling the impedance of the active element such that the detection value matches the target value.

In this lighting device, when the second light source block is shifted from a lit condition to an extinguished condition, the switching control circuit preferably reduces an absolute value of the target value of the end-to-end voltage of the active element over time at a predetermined time constant from a value thereof when the active element is OFF to a value thereof when the active element is ON, and the control unit preferably varies the impedance of the active element as the absolute value of the target value decreases.

In this lighting device, when a capacitance of capacitors connected in parallel between an output stage of the power supply circuit and the light source group is set as C, the end-to-end voltage of the active element when the active element is OFF is set as $V0$, and a load current flowing to the light source group is set as $I0$, the switching control circuit preferably reduces the absolute value of the target value from the value thereof when the active element is OFF to the value thereof when the active element is ON over a period of at least $C \times V0/I0$.

In this lighting device, when the second light source block is shifted from the extinguished condition to the lit condition, the switching control circuit preferably increases the absolute value of the target value overtime at a predetermined time constant from the value thereof when the active element is ON to the value thereof when the active element is OFF, and the control unit preferably varies the impedance of the active element as the absolute value of the target value increases.

In this lighting device, the power supply circuit preferably includes an overvoltage control unit that monitors an output voltage of the power supply circuit and limits the output voltage to or below an upper limit value, which is larger than a maximum value when the light source group is lit in a steady state, and the switching circuit preferably switches the upper limit value in response to a switch in the second light source block between the lit condition and the extinguished condition.

In this lighting device, the light source group is preferably constituted by a plurality of light emitting diodes connected in series.

A vehicle headlamp according to the present invention includes: the lighting device described above; and a lamp main body attached to a vehicle.

According to the present invention, the control unit of the switching circuit controls the impedance of the active element such that the current flowing through the active element or the end-to-end voltage of the active element matches the target value set by the switching control circuit. Therefore, a constant operating characteristic can be obtained during a switch in the ON/OFF condition of the active element, and a delay in the start of a switch in the ON/OFF condition of the active element can be suppressed.

BRIEF DESCRIPTION OF THE DRAWINGS

Preferred embodiments of the present invention will be described in further detail below. Other features and advantages of the present invention will become more apparent with reference to the following detailed description and the attached drawings.

DETAILED DESCRIPTION OF EXEMPLARY EMBODIMENTS (First Embodiment)

Figure 1:
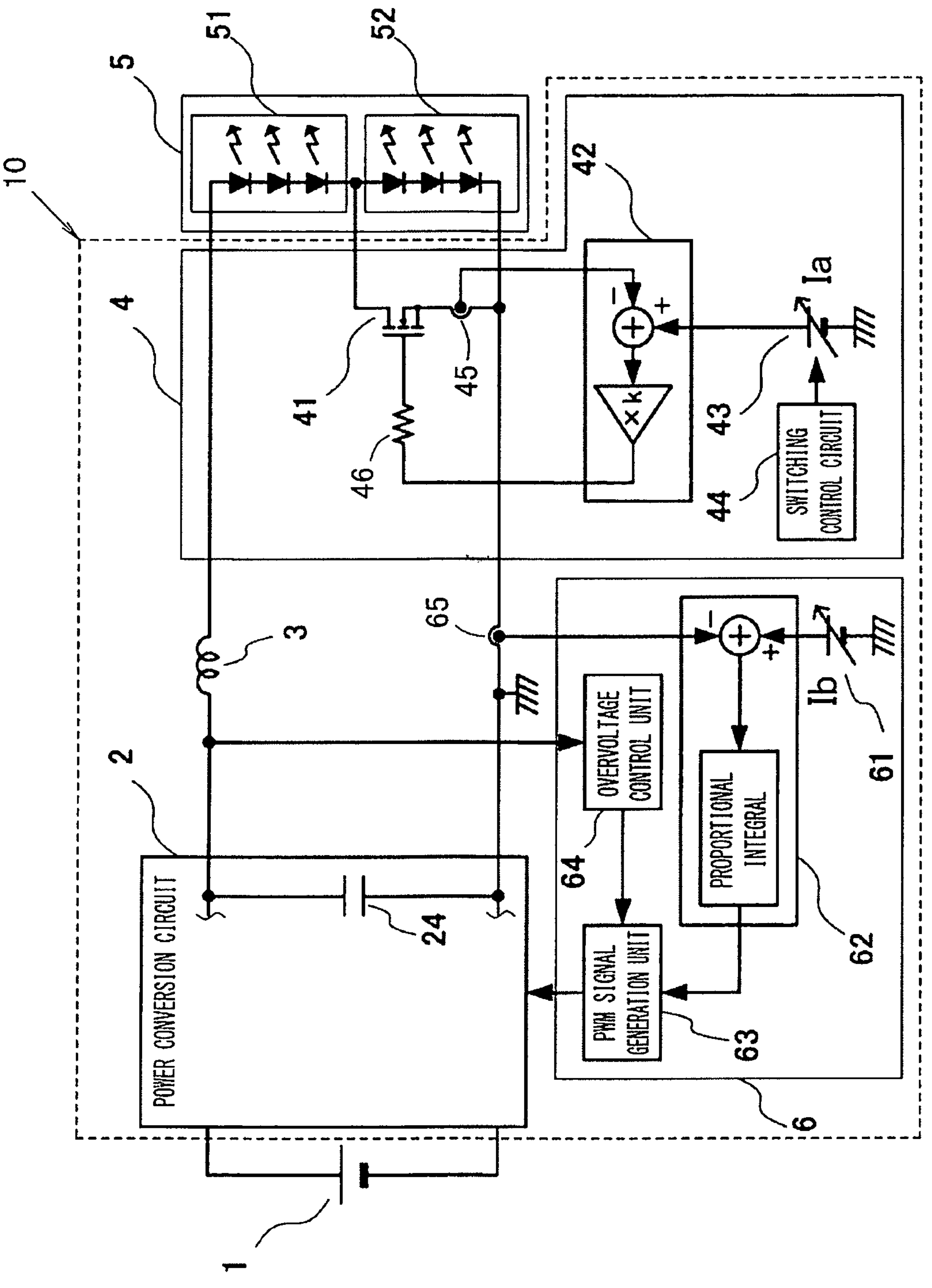
FIG. 1 is a schematic circuit diagram showing a configuration of a lighting device according to a first embodiment.

As shown in FIG. 1, a lighting device 10 according to this embodiment includes a power conversion circuit 2 that supplies power to a light source group 5 using an output of a direct current power supply 1 as an input, an output control circuit 6 that controls the power conversion circuit 2, and a switching circuit 4 to be described below. Note that the direct current power supply 1 may be a battery or the like, or a power supply circuit that rectifies and smoothens an output voltage of an alternating current power supply such as a commercial power supply in order to convert the output voltage into a direct current voltage.

The light source group 5 is constituted by a first light source block 51 and a second light source block 52, in each of which a plurality of light emitting diodes (LEDs) serving as solid state light sources are connected in series. In the example of FIG. 1, three LEDs are connected in series in each of the first light source block 51 and the second light source block 52, and the light source group 5 is formed by connecting the two light source blocks 51, 52 in series between output ends of the power conversion circuit 2. Here, the two light source blocks 51, 52 are connected such that the first light source block 51 are connected to a high potential side of the power conversion circuit 2 and the second light source block 52 are connected to a low potential (a circuit ground) side of the power conversion circuit 2.

The power conversion circuit 2 is constituted by a DC/DC conversion circuit (a converter) that converts the direct current voltage from the direct current power supply 1 into a direct current voltage having a magnitude required to light the light source group 5 with stability. Technology relating to a DC/DC conversion circuit is well known, and therefore description of a specific configuration of the power conversion circuit 2 will be omitted here. A chopper converter, a flyback converter, a forward converter, and so on may be cited as examples of a typical DC/DC conversion circuit.

This type of power conversion circuit 2 includes at least an inductor element (not shown), a switching element (not shown), a rectifying element (not shown), and a smoothing element (a capacitor 24), and connects/disconnects power supplied to the inductor element from the direct current power supply 1 at a high frequency using the switching element. By means of a switching operation performed by the switching element, the power conversion circuit 2 boosts or reduces a voltage output from the inductor element, which is connected in series to a load (the light source group 5), to the load via the rectifying element relative to an input voltage. For example, the inductor element is an inductor (coil) or a transformer.

The smoothing capacitor 24 provided at an output stage of the power conversion circuit 2 reduces a ripple in the output voltage. Further, when a similar load to a constant voltage load that operates at a substantially constant voltage (a forward voltage), such as an LED, is connected to the output of the power conversion circuit 2, even a slight ripple in the output voltage may cause a comparatively large ripple to appear in an output current. Therefore, the lighting device 10 shown in FIG. 1 employs a configuration in which an inductor element ("an inductor 3" in the drawing) is inserted between the power conversion circuit 2 and the light source group 5.

The output control circuit 6 includes a command value generation unit 61 that generates a command value, an error amplification unit 62 that calculates an error between an output value of the power conversion circuit 2 and the command value, a PWM signal generation unit 63 that drives the switching element of the power conversion circuit 2, and an overvoltage control unit 64 that suppresses overvoltage output.

The error amplification unit 62 outputs a result obtained by proportional integral calculation of an error (command value−output value) between the output current (the output value) of the power conversion circuit 2, which is detected by a detection unit 65, and a predetermined command value Ib output by the command value generation unit 61 to the PWM signal generation unit 63 as a PWM command signal. The PWM signal generation unit 63 adjusts a proportion and a frequency of an H (high) level period within a single period of a PWM signal for driving the switching element of the power conversion circuit 2 in accordance with the PWM command signal.

In other words, the output control circuit 6 performs pulse width modulation (PWM) control to adjust a duty ratio and a switching frequency of the switching element using the PWM control signal generated by the PWM signal generation unit 63 so as to maintain the output current of the power conversion circuit 2 at the predetermined command value Ib. By performing constant current control using the power conversion circuit 2 in this manner, a current flowing to the light source group 5 of the lighting device 10 is kept constant, and as a result, the light source group 5 is lit with stability. In short, the power conversion circuit 2 and the output control circuit 6 constitute a power supply circuit for supplying a constant current to the light source group 5. Note that the current flowing from the lighting device 10 to the light source group

5 serving as the load, or in other words the output current of the power conversion circuit 2, will be referred to hereafter as a load current.

Further, when the lighting device 10 performs the constant current control in an attempt to maintain the load current at a constant value in a case where the light source group 5 becomes disconnected from an output terminal (loose contact) or an open fault occurs in the light source group 5, leading to a large increase in a load impedance, the output voltage may become excessive. Therefore, the overvoltage control unit 64 monitors the output voltage of the power conversion circuit 2 and forcibly reduces the duty ratio of the PWM signal or increases the switching period to keep the output voltage at or below an upper limit value, which is larger than a maximum value during steady-state lighting of the light source group 5. Here, the overvoltage control unit 64 issues an instruction to the PWM signal generation unit 63 to adjust the duty ratio and the switching period (the frequency) forcibly. As a result, the output voltage of the power conversion circuit 2 of the lighting device 10 can be prevented from becoming excessive.

Incidentally, the lighting device 10 according to this embodiment is configured such that during an operation of the power conversion circuit 2, the first light source block 51 of the light source group 5 is lit at all times while the second light source block 52 is lit selectively. In other words, in the lighting device 10, one light source block (the second light source block 52) from among the light source blocks 51, 52 connected in series can be switched between a lit condition and an extinguished condition by the switching circuit 4.

The switching circuit 4 includes a short-circuiting active element 41 that bypasses the second light source block 52, a current detection circuit 45 that detects a current flowing to the active element 41, a target value generation unit 43 that generates a target value, and an error amplifier 42 that calculates an error between a detection value and the target value. The switching circuit 4 also includes a switching control circuit 44 to be described below.

The active element 41 includes a control terminal and has an impedance that can be varied in accordance with a control signal input into the control terminal, and is connected in parallel to the second light source block 52 and connected in series to the first light source block 51. In this embodiment, the active element 41 is constituted by an N-channel type metal-oxide-semiconductor field-effect transistor (MOSFET). In the active element 41, a drain-source impedance is varied by a control signal input into a gate serving as the control terminal. The drain of the active element 41 is connected to a connecting point between the first light source block 51 and the second light source block 52, while the source is connected to a cathode side terminal of the second light source block 52.

Thus, the active element 41 lights the second light source block 52 when the impedance (ON resistance) of the active element 41 equals or exceeds a predetermined value. In other words, when the active element 41 is OFF, the switching circuit 4 lights both the first and second light source blocks 51, 52 by supplying the output current of the power conversion circuit 2 to both light source blocks 51, 52. When the active element 41 is switched ON, on the other hand, the switching circuit 4 extinguishes the second light source block 52 and lights only the first light source block 51 by causing the output current of the power conversion circuit 2 to bypass the second light source block 52 using the active element 41 such that the current flowing to the second light source block 52 becomes substantially zero.

The current detection circuit 45 is provided on the active element 41 side of a parallel circuit constituted by the second light source block 52 and the active element 41 in order to detect a current flowing to the active element 41 from the load current that bifurcates to the second light source block 52 and the active element 41 from the first light source block 51. In other words, a sum of the current flowing through the active element 41, which is detected by the current detection circuit 45, and the current flowing through the second light source block 52 corresponds to the current flowing through the first light source block 51, or in other words the load current. The current detection circuit 45 detects a magnitude of the current flowing between respective ends (here, between the drain and the source) of the active element 41, and outputs the magnitude of the detected current to the error amplifier 42 as the detection value.

The target value generation unit 43 generates a target value Ia serving as a target magnitude of the current flowing to the active element 41, or in other words the target value Ia of the current flowing through the active element 41, and outputs the generated target value Ia to the error amplifier 42. Here, the magnitude of the output target value Ia is variable, and the target value generation unit 43 determines the magnitude of the target value Ia upon reception of a setting signal from the switching control circuit 44. An operation of the switching control circuit 44 will be described below.

The error amplifier 42 amplifies an error (target value−detection value) between the target value Ia input from the target value generation unit 43 and the detection value input from the current detection circuit 45 by a multiple of k (where k is a constant), and outputs the amplified error to the gate serving as the control terminal of the active element 41 as a control signal. Hence, the impedance of the active element 41 varies in accordance with the output of the error amplifier 42. Note that a resistor 46 is inserted between an output end of the error amplifier 42 and the gate of the active element 41.

Therefore, when the detection value of the current detection circuit 45 is smaller than the target value Ia, the output of the error amplifier 42 increases, leading to an increase in a gate voltage (the control signal) of the active element 41, and as a result, the ON resistance (impedance) of the active element 41 decreases, causing the current flowing through the active element 41 to increase. When the detection value of the current detection circuit 45 is larger than the target value Ia, on the other hand, the output of the error amplifier 42 decreases, leading to a reduction in the gate voltage (the control signal) of the active element 41, and as a result, the ON resistance of the active element 41 increases, causing the current flowing through the active element 41 to decrease. Thus, the switching circuit 4 feedback-controls the current flowing to the active element 41 such that the detection value matches the target value Ia.

In other words, the current detection circuit 45, the error amplifier 42, the target value generation unit 43, and the resistor 46 of the switching circuit 4 together constitute a control unit for feedback-controlling the current flowing to the active element 41. The control unit detects the current flowing through the active element 41 as the detection value, and controls the impedance of the active element 41 such that the detection value matches the target value Ia. Note that the control unit is not limited to a configuration in which the current is feedback-controlled using a detection value, and any configuration in which the impedance of the active element 41 is controlled such that the current flowing through the active element 41 matches the target value Ia may be employed.

Here, the switching control circuit 44 sets the magnitude of the target value Ia generated by the target value generation unit 43 as follows by outputting the setting signal to the target value generation unit 43 after receiving input from an operating unit (not shown) that receives operation input from a human.

When the second light source block 52 is lit and the active element 41 is OFF, the switching control circuit 44 sets the target value Ia at a predetermined value (a negative value) no greater than substantially zero. At this time, the load current is a direct current, and does not therefore fall to or below zero. Hence, the output of the error amplifier 42 falls to or below zero, and since the output of the error amplifier 42 is input into the gate serving as the control terminal, the active element 41 is maintained in the OFF condition.

When the operating unit is operated to switch the active element 41 ON such that the lit second light source block 52 is extinguished, on the other hand, the switching control circuit 44 varies the target value Ia so as to increase gradually from substantially zero. At this time, the error amplifier 42 feedback-controls the current flowing to the active element 41 so as to match the target value Ia by adjusting the gate voltage (the control signal) of the active element 41 in accordance with a comparison result between the target value Ia and the detection value.

Figure 2:
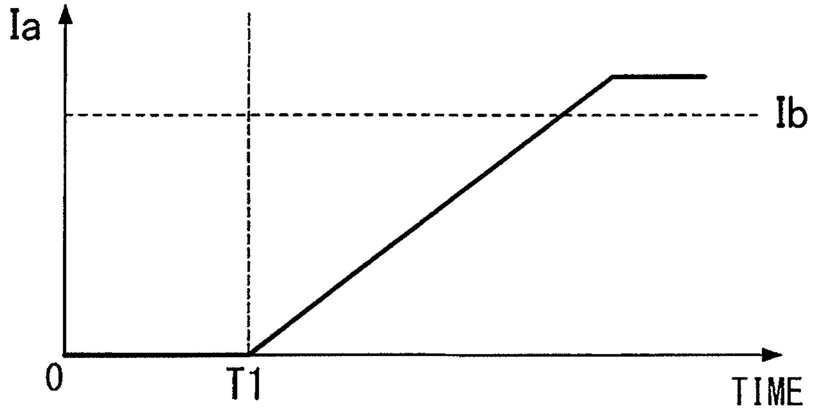
FIG. 2 is a view illustrating an operation of the lighting device according to the first embodiment.

In short, when the operating unit is operated to switch the active element 41 ON such that the second light source block 52 is extinguished, the switching control circuit 44 increases the target value Ia monotonically from substantially zero over time at a predetermined time constant from an operation timing T1 of the operating unit, as shown in FIG. 2. Hence, in the switching circuit 4, the current flowing through the active element 41 is increased monotonically over time at an increase rate based on the target value Ia, and therefore the active element 41 is soft-switched when switched from the OFF condition to the ON condition. Note that in FIG. 2, an abscissa shows a temporal axis and an ordinate shows the target value Ia.

When the active element 41 shifts from the OFF condition to the ON condition in this manner, a part of the load current flowing to the second light source block 52 bifurcates to the active element 41 side by an amount corresponding to the target value Ia. Note, however, that a current continues to flow to the second light source block 52 until the active element 41 is completely ON, and therefore voltages (forward voltages) from respective ends of the second light source block 52 are applied to respective ends of the active element 41.

When the target value Ia is in the immediate vicinity of a load current value Ib, almost all of the load current flows to the active element 41, and therefore a smaller voltage than a barrier voltage (a forward voltage) of the LEDs constituting the second light source block 52 remains in the respective ends of the active element 41. Here, the load current value Ib is a value of the load current during steady-state lighting of the light source group 5, and is identical to the command value Ib output from the command value generation unit 61. Even if the target value Ia increases further from this condition, the current flowing through the active element 41 does not increase to or above the output current (the load current) of the power conversion circuit 2, and therefore the gate voltage of the active element 41 is increased further by the action of the error amplifier 42, whereby the active element 41 is switched completely ON. In other words, the active element 41 operates in a saturation region such that, at this point in time, an end-to-end voltage of the active element 41 is substantially zero.

Hence, when the active element 41 is shifted from the OFF condition to the ON condition, the switching control circuit 44 monotonically increases the target value Ia at a predetermined time constant from substantially zero (a value when the active element 41 is OFF) to a predefined value (a value when the active element 41 is ON) set at or above the load current value Ib.

Further, the switching control circuit 44 preferably sets a variation speed of the target value Ia when the active element 41 is switched from the OFF condition to the ON condition to be lower than a response in the output of the power conversion circuit 2 (i.e. a variation speed of the output voltage). In other words, when the active element 41 is shifted to the ON condition, the number of lit light source blocks decreases, leading to a rapid reduction in a required load voltage. However, the output voltage of the power conversion circuit 2 cannot vary rapidly to the reduced load voltage, and therefore a surge current is generated. By setting an increase speed of the target value Ia to be lower than the response of the output of the power conversion circuit 2, however, the lighting device 10 can reliably prevent a surge current from flowing to the light source group 5. Note that here, the load voltage is an end-to-end voltage of the light source group 5 serving as the load.

When the operating unit is operated to switch the active element 41 OFF such that the second light source block 52 is shifted to a lit condition from the extinguished condition, the switching control circuit 44 sets the target value Ia at or below substantially zero. Accordingly, the output of the error amplifier 42 decreases rapidly to or below substantially zero, leading to a rapid reduction in the gate voltage of the active element 41, and as a result, the active element 41 shifts rapidly to the OFF condition. At this time, even though the switching control circuit 44 reduces the target value Ia rapidly to or below zero such that the active element 41 is rapidly switched OFF, the output voltage of the power conversion circuit 2 remains low, and therefore an excessive current does not flow and stress is not generated in the light source group 5.

In other words, since the end-to-end voltage of the active element 41 in the ON condition is substantially zero, when the second light source block 52 is extinguished, the voltage (the output voltage of the power conversion circuit 2) applied to the light source group 5 decreases to the forward voltage of the first light source block 51. Even if the active element 41 is switched OFF rapidly from this condition, the output voltage of the power conversion circuit 2 remains lower than an operating voltage of the light source group 5 (a voltage obtained by adding the forward voltage of the second light source block 52 to the forward voltage of the first light source block 51), and therefore an excessive load current does not flow to the light source group 5.

However, when the target value Ia decreases rapidly to or below zero, as described above, and the output voltage of the voltage conversion circuit 2 is lower than the operating voltage of the light source group 5, the output voltage of the power conversion circuit 2 may be insufficient, and as a result, the lit first light source block 51 may be momentarily extinguished. In other words, the first light source block 51 may be extinguished momentarily until the output voltage of the power conversion circuit 2 increases to the operating voltage of the light source group 5, and as a result, flickering may occur in the lighting device 10. To prevent the lit first light source block 51 from being momentarily extinguished in this manner, the switching control circuit 44 may be configured to reduce the target value Ia monotonically at a predetermined time constant, as shown in FIG. 3, when the active element 41 is switched OFF from the ON condition.

Figure 3:
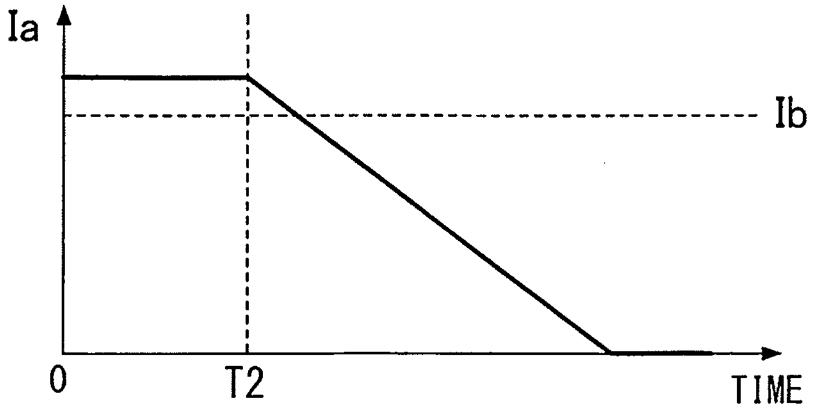
FIG. 3 is a view illustrating an operation of the lighting device according to the first embodiment.

More specifically, when the operating unit is operated to switch the active element 41 OFF such that the second light source block 52 is lit, the switching control circuit 44 may monotonically reduce the target value Ia from a predefined value to or below substantially zero over time at a predetermined time constant from an operation timing T2 of the operating unit, as shown in FIG. 3. In other words, in the example of FIG. 3, the switching control circuit 44 monotonically reduces the target value Ia at a predetermined time constant from the value when the active element 41 is ON to the value when the active element 41 is OFF. In response, the switching circuit 4 monotonically reduces the current flowing through the active element 41 over time at a reduction rate based on the target value Ia.

Here, the voltages generated in the respective ends of the active element 41, or in other words the voltage applied to the second light source block 52, increase as the ON resistance of the active element 41 increases, and therefore the reduced part of the voltage flowing through the active element 41 begins to flow to the second light source block 52 such that the second light source block 52 is gradually lit. At this time, the end-to-end voltage of the active element 41 increases comparatively gently, and therefore a deficiency in the output voltage of the power conversion circuit 2 relative to the operating voltage of the light source group 5 can be prevented, thereby suppressing a reduction (a luminous flux reduction) in the current of the first light source block 51. Note that in FIG. 3, an abscissa shows a temporal axis and an ordinate shows the target value Ia.

Furthermore, when the switching control circuit 44 switches the active element 41 from the ON condition to the OFF condition by gradually reducing the target value Ia, the variation speed of the target value Ia is preferably set to be lower than the response in the output of the power conversion circuit 2 (i.e. the variation speed of the output voltage). In other words, when the active element 41 is shifted to the OFF condition, the number of lit light source blocks increases, leading to an increase in the required load voltage. However, the output voltage of the power conversion circuit 2 does not increase instantaneously to the load voltage, and therefore the lit light source block is momentarily extinguished (dimmed). By setting the reduction speed of the target value Ia to be lower than the response in the output of the power conversion circuit 2, however, the lighting device 10 can reliably prevent the lit light source block from being momentarily extinguished (dimmed).

With the lighting device 10 according to this embodiment, described above, the switching circuit 4 detects the current flowing to the active element 41, and feedback-controls the current by adjusting the impedance of the active element 41 such that the current is aligned with the target value Ia set by the switching control circuit 44. Here, when the active element 41 is switched ON, the switching circuit 4 increases the target value Ia of the current flowing to the active element 41 gradually over time, and therefore an excessive load current can be prevented from flowing while the active element 41 shifts from the OFF condition to the ON condition.

In other words, the lighting device 10 can prevent an excessive surge current from flowing to the light source group 5 when the active element 41 shifts from OFF to ON. Further, the switching circuit 4 increases the target value Ia at a gentler speed than the response in the output of the power conversion circuit 2, and therefore instability phenomena such as ringing occurring in the output of the power conversion circuit 2 when the active element 41 is switched ON can be suppressed.

Note that in order to switch the number of lit light source blocks, an individual power conversion circuit may be provided for each light source block. In this case, however, a plurality of power conversion circuits are required, leading to increases in the size, circuit complexity, and cost of the lighting device. In the lighting device 10 according to this embodiment, on the other hand, the plurality of light source blocks 51, 52 are connected in series to the output of the single power conversion circuit 2, and therefore the number of lit light source blocks is switched using the active element 41 connected in parallel to a part of the light source blocks (the second light source block 52). Hence, with the lighting device 10 according to this embodiment, increases in size, circuit complexity, and cost can be avoided.

Incidentally, in the MOSFET used in this embodiment as the active element 41, a threshold voltage exists in the gate voltage, and in the active region where the gate voltage is in the vicinity of the threshold voltage, the ON resistance varies greatly in response to variation in the gate voltage. However, as long as a certain voltage difference exists between the gate voltage and the threshold voltage, this type of active element 41 switches completely the ON condition or the OFF condition so as to operate in a dead zone (a saturation region or a cutoff region) where the ON resistance exhibits little variation in response to variation in the gate voltage.

In this embodiment, the switching circuit 4 operates such that a current corresponding to the target value Ia flows to the active element 41, and therefore, in the dead zone where the current flowing through the active element 41 exhibits substantially no variation, the output of the error amplifier 42 varies rapidly such that substantially no time is needed to exit the dead zone. In other words, with the switching circuit 4 according to this embodiment, a delay (a delay caused by the dead zone of the active element 41) between an operation of the operating unit and the start of a switch in the ON/OFF condition of the active element 41 after the control signal (the gate voltage) reaches the threshold value can be suppressed.

Further, the switching circuit 4 operates such that a current corresponding to the target value Ia flows to the active element 41, and therefore, even though a transient characteristic of the active element 41 varies during a shift from the OFF condition to the ON condition according to element variation and temperature characteristics, effects of this variation can be suppressed. Note that even when variation occurs in a variation sensitivity of the ON resistance to variation in the control signal in the vicinity of the threshold of the active element 41 (the active region), the effect thereof on the function of the switching circuit 4 for preventing an excessive surge current from flowing is small.

Therefore, with the lighting device 10 according to this embodiment, a constant operating characteristic can be obtained during a switch in the ON/OFF condition of the active element 41, and a delay in the start of the switch in the ON/OFF condition of the active element 41 can be suppressed.

Figure 4:
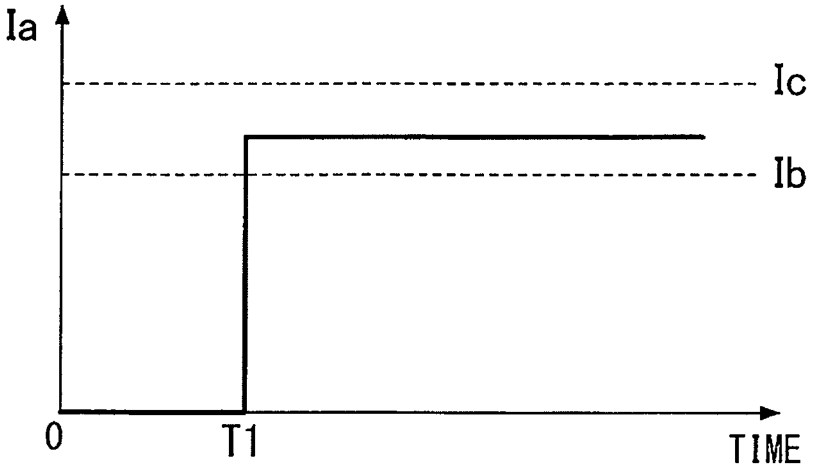
FIG. 4 is a view illustrating an operation of the lighting device according to a modified example of the first embodiment.

As a modified example of this embodiment, when the active element 41 is switched ON in order to extinguish the second light source block 52, the switching control circuit 44 may be configured to increase the target value Ia comparatively rapidly at the operating timing T1 of the operating unit, as shown in FIG. 4. Note that in this case, the increased target value Ia is set at a predefined value which is larger than the value (the load current value) Ib of the load current during steady-state lighting of the light source group 5 and smaller than a maximum allowable current Ic of the light source group 5.

According to this modified example, the current of the first light source block 51, which is kept lit, increases momentarily beyond the load current value Ib, but since the current is suppressed to be lower than the maximum allowable current Ic of the light source group 5, an improvement in switching speed can be obtained without adverse effects such as deterioration and breakage of the light source group 5. Furthermore, according to this modified example, loss in the active element 41 can be reduced during a switching operation to shift the second light source block 52 from the lit condition to the extinguished condition, and therefore the size of the active element 41 can be reduced.

Figure 5:
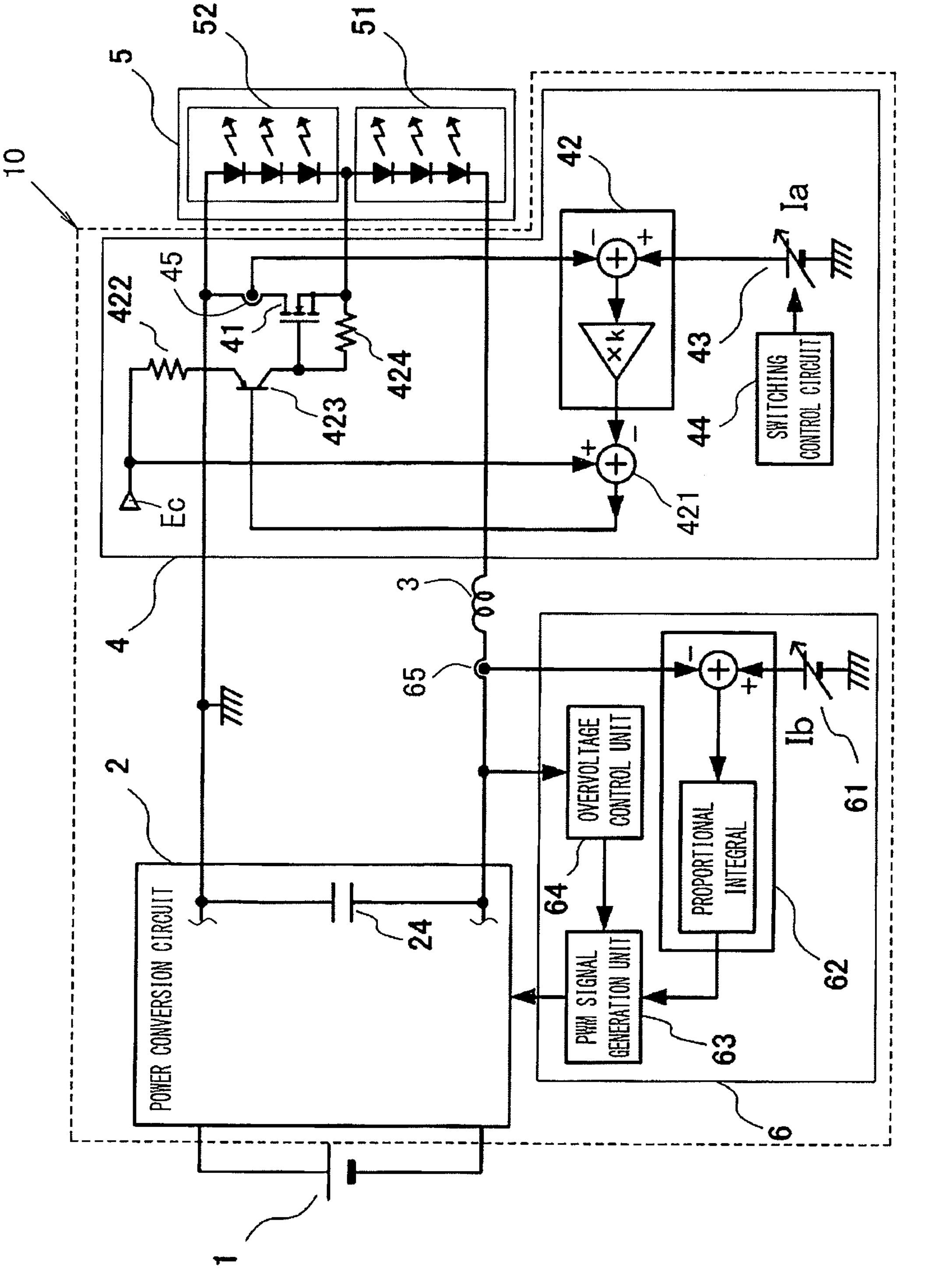
FIG. 5 is a schematic circuit diagram showing a configuration of a lighting device according to another modified example of the first embodiment.

In another modified example of this embodiment, as shown in FIG. 5, the lighting device 10 may be configured such that the high potential side output end of the power conversion circuit 2 is connected to the circuit ground, whereby the output of the power conversion circuit 2 is on a negative potential side of the circuit ground. In this case, a similar circuit configuration to that of FIG. 1 may be employed in the lighting device 10 such that a P channel type MOSFET is used as the active element 41 and the error amplifier 42 is configured to be capable of negative output. In FIG. 5, however, an N channel type FET having a favorable ON resistance characteristic is employed as the active element 41.

In the example of FIG. 5, the switching circuit 4 further includes a subtraction circuit 421 that outputs a signal obtained by subtracting the output value of the error amplifier 42 from the output voltage value of a control power supply Ec, a PNP type transistor 423 controlled by the output of the subtraction circuit 421, and resistors 422, 424. Further, in the example of FIG. 5, the second light source block 52 is connected to the high potential side output (the circuit ground) of the power conversion circuit 2, and the first light source block 51 is connected to the low potential side output. The active element 41 is connected in parallel to the second light source block 52, while the drain thereof is connected to the high potential side output (the circuit ground) of the power conversion circuit 2.

A base serving as a control terminal of the transistor 423 is connected to an output end of the subtraction circuit 421. The transistor 423 and the resistor 422 are connected in series and inserted between the control power supply Ec and the gate of the active element 41. The resistor 424 is connected between the gate and the source of the active element 41.

Next, an operation of the lighting device 10 having the configuration shown in FIG. 5 will be described briefly.

When the lit second light source block 52 is to be extinguished, the lighting device 10 causes the switching control circuit 44 to increase the target value Ia from a predetermined value at or below substantially zero in order to switch the OFF active element 41 ON. Here, the detection value of the current detection circuit 45 when the active element 41 is in the OFF condition is zero, and therefore, when the target value Ia increases, the output of the error amplifier 42 also increases.

At this time, a signal obtained by subtracting the output value of the error amplifier 42 from an output voltage value of the control power supply Ec is input into the base of the transistor 423. Accordingly, a voltage obtained by superimposing a base-emitter voltage on a base voltage is generated in an emitter such that a current which is commensurate with a difference between this voltage and the output voltage of the control power supply Ec flows to the resistor 422 and a substantially identical current flows to the resistor 424 from a collector of the transistor 423. As a result, voltages generated in respective ends of the resistor 424 are applied to the gate of the active element 41, whereby the ON resistance of the active element 41 decreases, causing the active element 41 to shift to the ON condition.

When, on the other hand, the current flowing through the active element 41 increases beyond the target value Ia, the output of the error amplifier 42 decreases and the base voltage of the transistor 423 increases, leading to a reduction in the current flowing to the resistor 422 and a corresponding reduction in the gate voltage of the active element 41. As a result, the ON resistance of the active element 41 increases.

Note that when the second light source block 52 is shifted from the extinguished condition to the lit condition in this lighting device 10, the switching control circuit 44 reduces the target value Ia to substantially zero.

Further, the specific circuits of the lighting device according to this embodiment are not limited to the configurations shown as examples in FIGS. 1 and 5 as long as a switching circuit capable of detecting the current flowing to the active element and adjusting the impedance of the active element so that the current matches the target value set by the switching control circuit is provided. Moreover, in the example described above, the light source block (the second light source block) provided with the active element is connected to the circuit ground by one terminal, but is not limited to this configuration. Instead, the light source group may be constituted by three or more light source blocks connected in series, and in this case, the switching circuit may be configured such that the active element is connected in parallel to a center light source block of the light source blocks connected in series so as to bypass this light source block.

Note that in the lighting device described above, a MOSFET is used as the active element, but the present invention is not limited to this example, and another active element, such as a different transistor to a MOSFET or an insulated gate bipolar transistor (IGBT), may be used instead.

(Second Embodiment)

Figure 6:
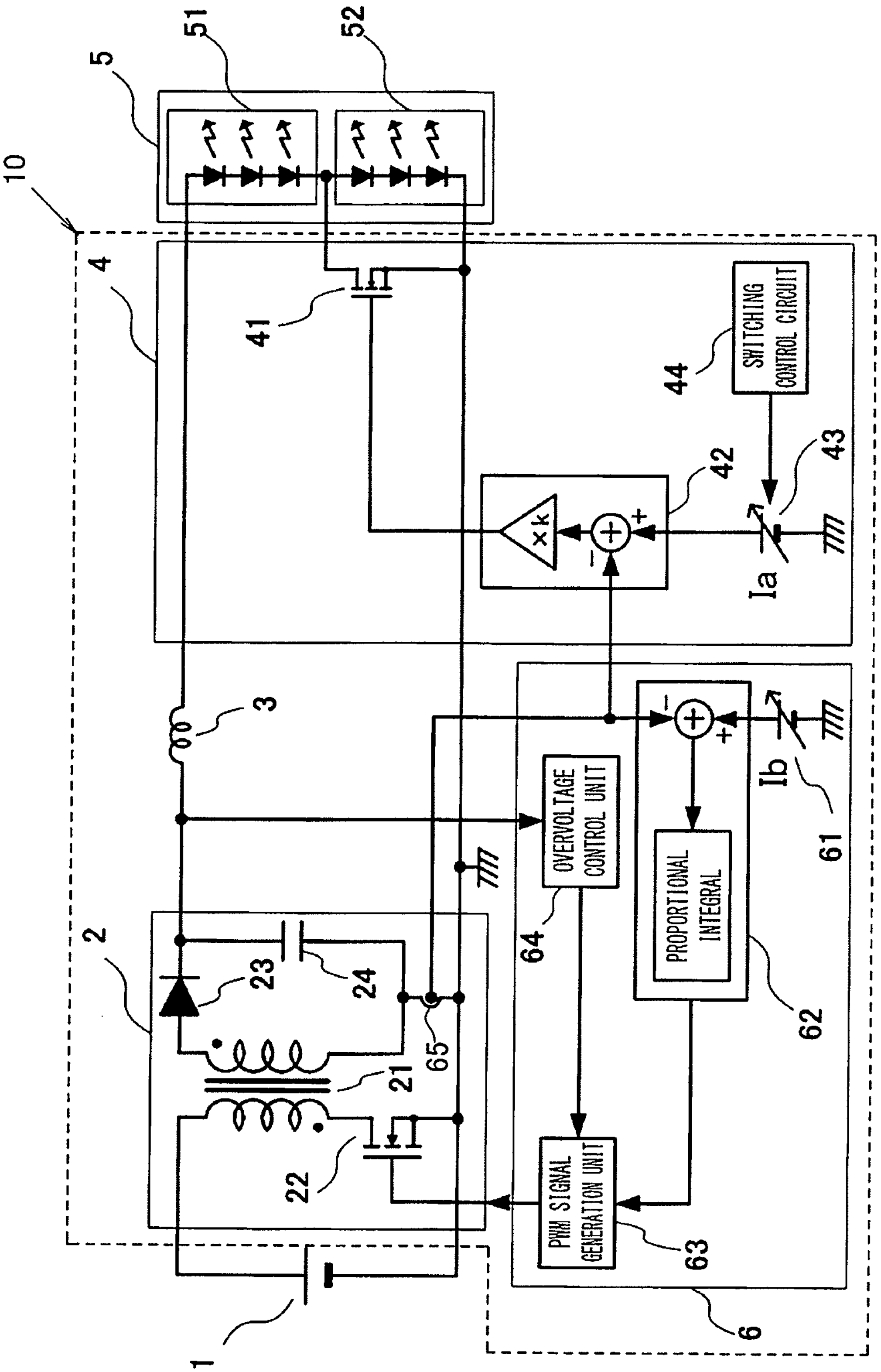
FIG. 6 is a schematic circuit diagram showing a configuration of a lighting device according to a second embodiment.

As shown in FIG. 6, the lighting device 10 according to this embodiment differs from the lighting device 10 according to the first embodiment in that the current detection circuit for detecting the current flowing to the active element 41 doubles as a detection unit 65 for controlling the output of the power conversion circuit 2. Hereafter, common reference symbols have been allocated to similar configurations to the first embodiment, and where appropriate, description thereof has been omitted.

Note that in the example of FIG. 6, the power conversion circuit 2 is constituted by a flyback converter. The power conversion circuit 2 is configured such that a series circuit of a primary winding of a flyback transformer 21 and a switching element 22 are connected between output ends of the direct current power supply 1, while a diode 23 and the capacitor 24 are connected in series between respective ends of a secondary winding of the flyback transformer 21. The detection unit 65 detects a current flowing between a negative electrode of the capacitor 24 and the circuit ground.

In this embodiment, the error amplifier 42 amplifies an error (target value−detection value) between the target value Ia input from the target value generation unit 43 and a detection value input from the detection unit 65 by a multiple of k (where k is a constant), and outputs the amplified error to the gate serving as the control terminal of the active element 41 as a control signal. According to this configuration, the error amplifier 42 controls the control signal (the gate voltage) of the active element 41 upon reception of the output current (the load current) of the power conversion circuit 2, detected by the detection unit 65, and therefore the current flowing to the active element 41 cannot be controlled to or below the load current. Hence, when the switching control circuit 44 reduces the target value Ia below the load current, the switching circuit 4 erroneously switches the active element 41 OFF.

In this embodiment, in response to this problem, when the active element 41 is switched ON, the switching control circuit 44 rapidly switches the target value Ia to a predetermined value set to be larger than the load current value Ib and smaller than the maximum allowable current Ic of the light source group 5, as shown in FIG. 4. Thus, when the switching circuit 4 shifts the active element 41 to the ON condition, a surge current generated when a charge stored in the smoothing capacitor 24 of the power conversion circuit 2 flows through the first light source block 51 can be suppressed to be lower than the maximum allowable current Ic of the light source group 5.

All other configurations and functions are similar to the first embodiment.

(Third Embodiment)

Figure 7:
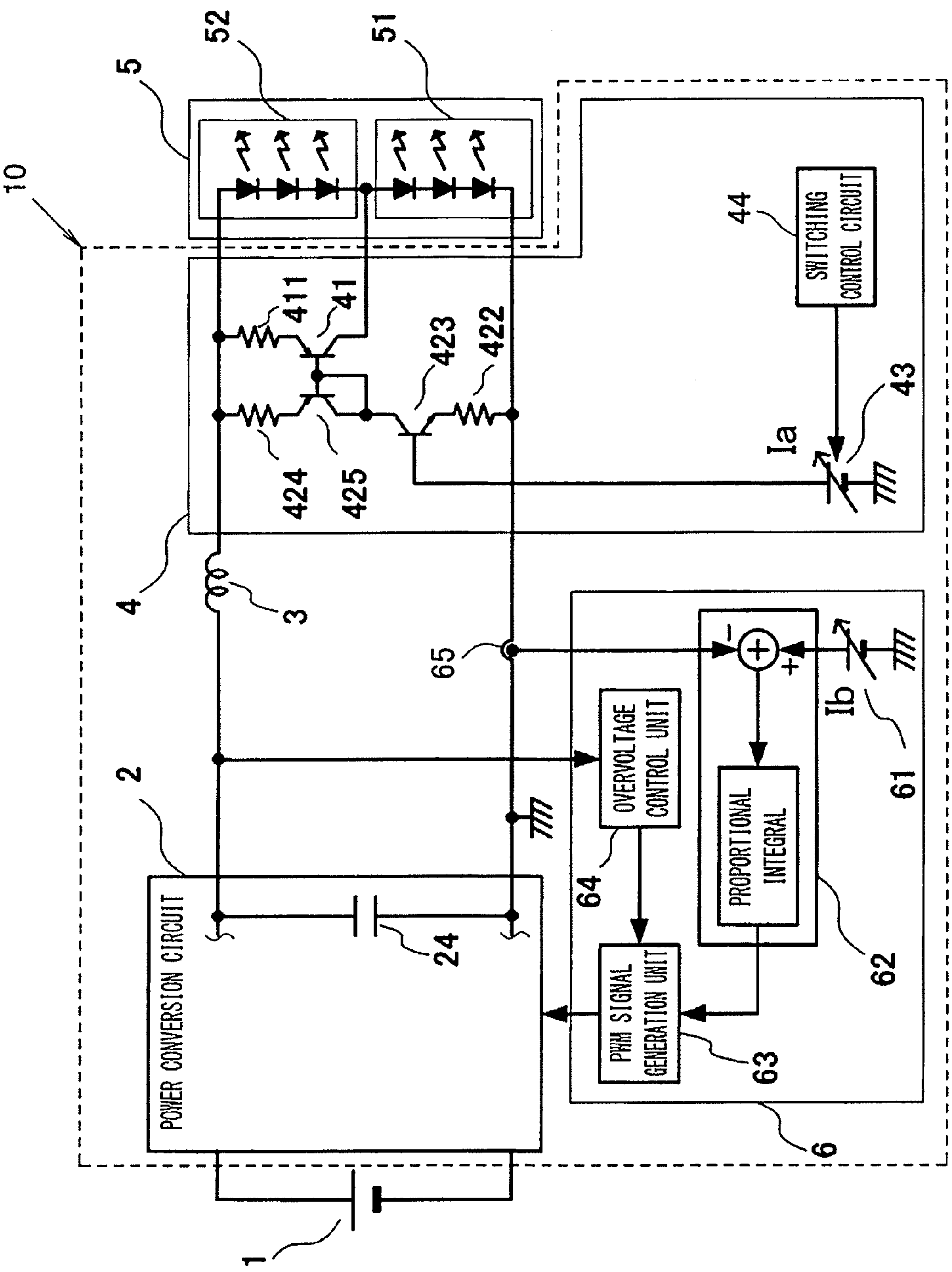
FIG. 7 is a schematic circuit diagram showing a configuration of a lighting device according to a third embodiment.

As shown in FIG. 7, the lighting device 10 according to this embodiment differs from the lighting device 10 according to the first embodiment in that the current flowing to the active element 41 is controlled to the target value Ia using a current mirror circuit in place of the error amplifier 42 and the current detection circuit 45. Hereafter, common reference symbols have been allocated to similar configurations to the first embodiment, and where appropriate, description thereof has been omitted.

In the example of FIG. 7, the second light source block 52 is connected to the high potential side output of the power conversion circuit 2, and the first light source block 51 is connected to the low potential side output (the circuit ground). In the configuration shown in FIG. 7, the active element 41 is constituted by a PNP type transistor, and forms the current mirror circuit together with another PNP type transistor 425 and resistors 411, 424.

More specifically, a series circuit including the active element 41 and the resistor 411 is connected in parallel to the second light source block 52. Respective bases of the transistor 425 and the active element 41 are connected to each other, while a collector and a base of the transistor 425 are short-circuited. The resistor 411 is inserted between the emitter of the active element 41 and a positive electrode side (an anode side) terminal of the second light source block 52, and the resistor 424 is inserted between an emitter of the transistor 425 and the positive electrode side (the anode side) terminal of the second light source block 52.

Further, an NPN type transistor 423 and a resistor 422 are connected in series between a collector of the transistor 425 and a negative electrode side (a cathode side) terminal of the first light source block 51. A base of the transistor 423 is connected to the output of the target value generation unit 43.

According to the configuration described above, the switching circuit 4 applies the target value Ia to the resistor 422 via the base of the transistor 423 such that a current which is commensurate with the target value Ia flows to the resistor 422. Hence, in the switching circuit 4, a current that is commensurate with the target value Ia flows to the resistor 424 via the collector of the transistor 423 and the emitter of the transistor 425.

Therefore, in the switching circuit 4, when resistance values of the resistors 424, 411 are set respectively at R424 and R411, a current of a multiple of R424/R411 of the emitter of the transistor 425 is caused to flow to the emitter of the active element 41 by an action of the current mirror circuit. Likewise with the switching circuit 4 according to this embodiment, therefore, the current flowing to the active element 41 can be controlled to the target value Ia.

Hence, by controlling the target value Ia as described in the first embodiment, the switching control circuit 44 can suppress both a surge current when the active element 41 shifts from the OFF condition to the ON condition and momentary dimming or extinguishing of the light source group 5 when the active element 41 shifts from the ON condition to the OFF condition.

Figure 8:
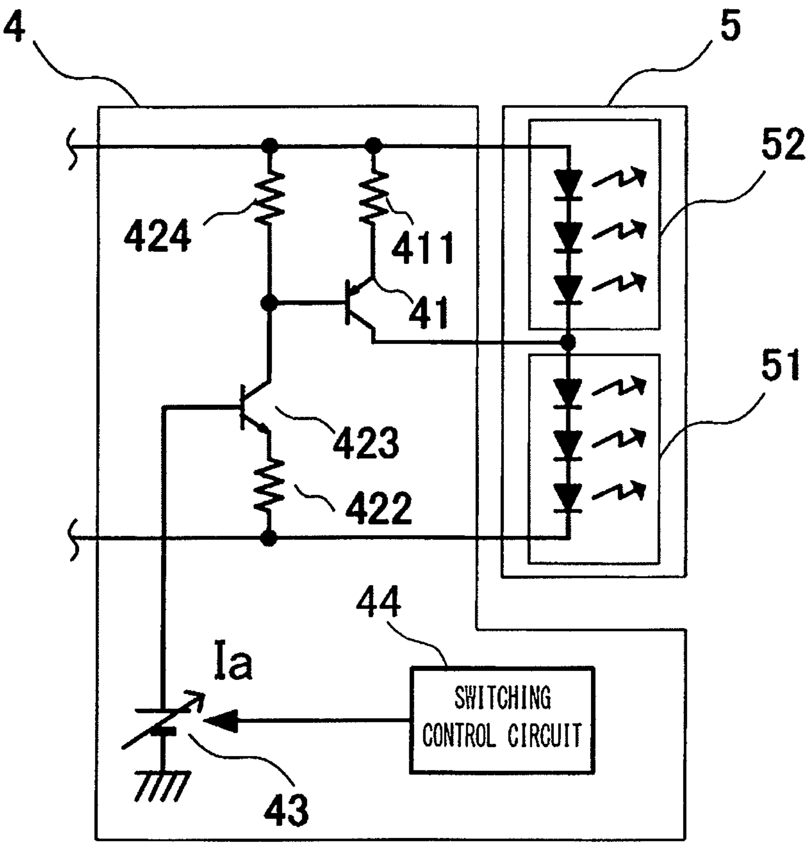
FIG. 8 is a schematic circuit diagram showing main parts of a lighting device according to a modified example of the third embodiment.

Further, as a modified example of this embodiment, as shown in FIG. 8, the transistor 425 may be omitted from the switching circuit 4. Moreover, the switching circuit 4 may be configured such that a diode which simulates the base-emitter voltage of the active element 41 is connected in series to the resistor 424.

Note that in the example of FIG. 7, the current mirror circuit for controlling the current flowing to the active element 41 to the target value Ia is constructed using a transistor, but the current mirror circuit is not limited to this configuration, and a FET, for example, may be used instead. Further, in the configuration shown in FIGS. 7 and 8, the current mirror circuit is provided on the high potential side of the circuit ground, but the current mirror circuit may be provided on the circuit ground side, and as shown in FIG. 5, the output of the power conversion circuit 2 may be applied to the lighting device 10 serving as the negative potential side.

All other configurations and functions are similar to the first embodiment.

(Fourth Embodiment)

The lighting device 10 according to this embodiment differs from the lighting device 10 according to the first embodiment in that the end-to-end voltage of the active element 41 is detected, whereupon the impedance of the active element 41 is adjusted such that the end-to-end voltage matches the target value set by the switching control circuit 44. Hereafter, common reference symbols have been allocated to similar configurations to the first embodiment, and where appropriate, description thereof has been omitted.

Figure 9:
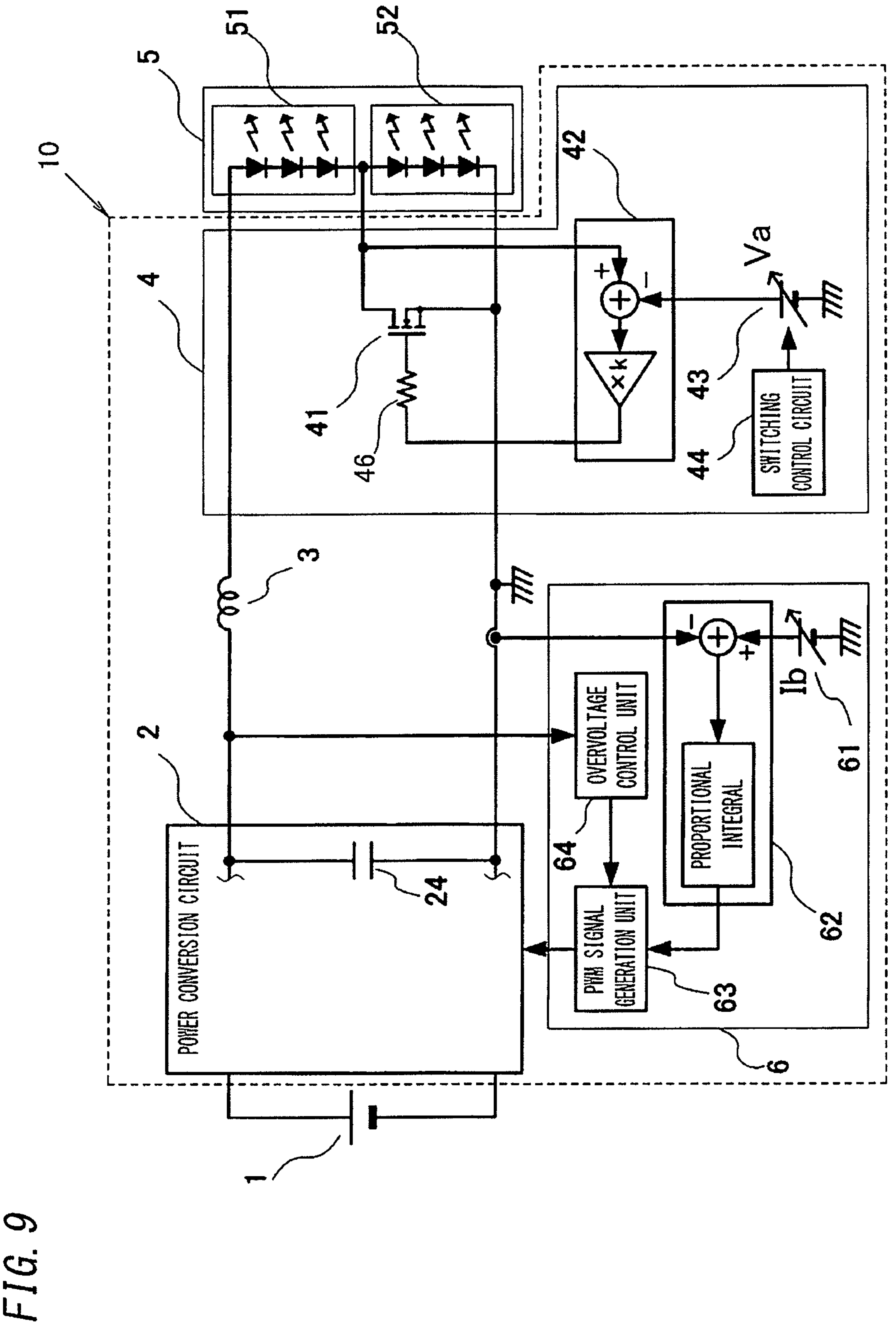
FIG. 9 is a schematic circuit diagram showing a configuration of a lighting device according to a fourth embodiment.

In this embodiment, as shown in FIG. 9, the switching circuit 4 is configured to detect an end-to-end voltage of the second light source block 52, or in other words the end-to-end voltage of the active element 41, and feedback-control the end-to-end voltage in accordance with a target value Va of the end-to-end voltage of the active element 41. More specifically, the error amplifier 42 is configured to amplify an error (detection value−target value) between a target value Va input from the target value generation unit 43 and a detection value of the end-to-end voltage of the active element 41 by a multiple of k (where k is a constant), and to output the amplified error to the gate serving as the control terminal of the active element 41 as a control signal. Note that this embodiment differs from the first embodiment in that the target value generation unit 43 generates the voltage target value Va instead of the current target value Ia, but is similar to the first embodiment in that the magnitude of the target value Va is variable, and the magnitude of the target value Va is determined upon reception of the setting signal from the switching control circuit 44.

In short, when the end-to-end voltage of the active element 41 is lower than the target value Va, the output of the error amplifier 42 decreases, and therefore the error amplifier 42 increases the ON resistance of the active element 41 such that the end-to-end voltage of the active element 41 increases. When, on the other hand, the end-to-end voltage of the active element 41 is higher than the target value Va, the output of the error amplifier 42 increases, and therefore the error amplifier 42 reduces the ON resistance of the active element 41 such that the end-to-end voltage of the active element 41 decreases. Thus, the switching circuit 4 feedback-controls the end-to-end voltage of the active element 41 such that the detection value thereof matches the target value Va.

In other words, in the switching circuit 4, the error amplifier 42, the target value generation unit 43, and the resistor 46 together constitute a control unit for feedback-controlling the end-to-end voltage of the active element 41. This control unit detects the end-to-end voltage of the active element 41 as the detection value, and controls the impedance of the active element 41 to align the detection value with the target value Va. Note, however, that as long as the impedance of the active element 41 is controlled such that the end-to-end voltage of the active element 41 matches the target value Va, the present invention is not limited to a configuration whereby the control unit feedback-controls the end-to-end voltage using the detection value.

Here, the switching control circuit 44 sets the magnitude of the target value Va generated by the target value generation unit 43 as follows by outputting the setting signal to the target value generation unit 43 after receiving input from the operating unit (not shown) that receives operation input from a human.

When the second light source block 52 is lit and the active element 41 is OFF, the switching control circuit 44 sets the target value Va at a value no smaller than a preset upper limit value Vb of the output voltage of the power conversion circuit 2. At this time, the end-to-end voltage of the active element 41 does not rise to or above the upper limit value Vb, and therefore the output of the error amplifier 42 remains at or below zero such that the active element 41 is maintained in the OFF condition when the output of the error amplifier 42 is input into the gate serving as the control terminal. As a result, the active element 41 can be prevented from malfunctioning when an open fault occurs in the second light source block 52. Note that the upper limit value Vb of the output voltage of the power conversion circuit 2 is set by the overvoltage control unit 64.

Figure 10:
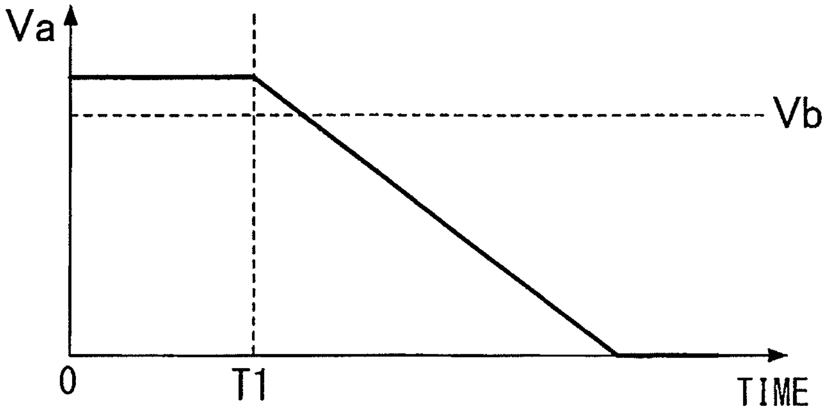
FIG. 10 is a view illustrating an operation of the lighting device according to the fourth embodiment.

When the operating unit is operated to switch the active element 41 ON such that the lit second light source block 52 is extinguished, on the other hand, the switching control circuit 44 varies the target value Va so as to decrease gradually. Here, as shown in FIG. 10, the switching control circuit 44 monotonically reduces the target value Va from the value no smaller than the upper limit value Vb (the value when the active element 41 is OFF) to substantially zero (the value when the active element 41 is ON) over time at a predetermined time constant from an operation timing T1 of the operating unit. In the switching circuit 4, when the target value Va falls to or below the end-to-end voltage of the active element 41, a signal corresponding to the error is output from the error amplifier 42 of the switching circuit 4 and applied to the gate of the active element 41 such that the active element 41 operates in the active region. As a result, a current begins to flow to the active element 41. In the active element 41, the ON resistance of the active element 41 is adjusted by feedback control such that the end-to-end voltage thereof matches the target value Va, and therefore the end-to-end voltage of the active element 41 decreases in accordance with the target value Va. Note that in FIG. 10, an abscissa shows a temporal axis and an ordinate shows the target value Va.

In the switching circuit 4 at this time, the current flowing through the active element 41 is increased monotonically over time at an increase rate based on the target value Va, and therefore the active element 41 is soft-switched when switched from the OFF condition to the ON condition. By having the switching circuit 4 gradually reduce the end-to-end voltage of the active element 41 in accordance with the target value Va in this manner, the load current flowing to the second light source block 52 can be diverted to the active element 41 side gradually, thereby preventing an excessive load current from flowing.

Further, the switching control circuit 44 preferably sets a reduction speed of the target value Va when the active element 41 is switched from the OFF condition to the ON condition to be lower than the response of the output of the power conversion circuit 2 (i.e. the variation speed of the output voltage). In other words, when the active element 41 is shifted to the ON condition, the number of lit light source blocks decreases, leading to a rapid reduction in the required load voltage. However, the output voltage of the power conversion circuit 2 cannot vary rapidly to the reduced load voltage, and therefore a surge current is generated. By setting the reduction speed of the target value Va to be lower than the response of the output of the power conversion circuit 2, however, the lighting device 10 can reliably prevent a surge current from flowing to the light source group 5.

More specifically, the switching control circuit 44 preferably sets the reduction speed of the target value Va such that a time required for the target value Va to decrease from the value when the active element 41 is OFF (the value no smaller than the upper limit value Vb) to zero is at least C×V0/I0. Here, "C" represents a capacitance of capacitors (including the smoothing capacitor 24) connected in parallel between the output stage of the power conversion circuit 2 and the light source group 5, "V0" represents the end-to-end voltage of the active element 41 when the active element 41 is in the OFF condition, and "I0" represents the load current.

Figure 11:
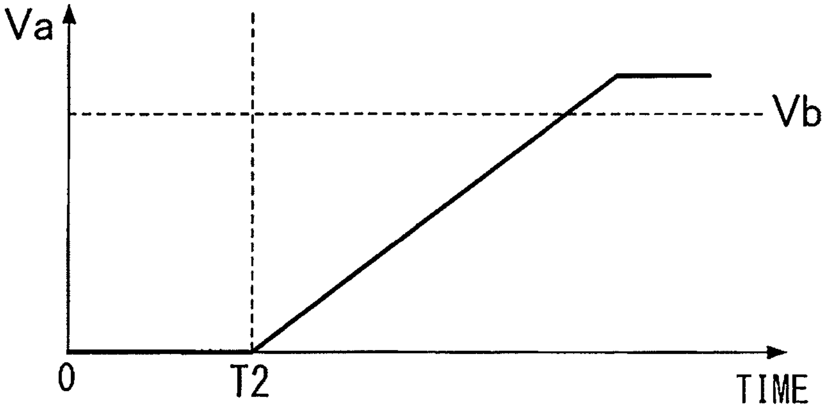
FIG. 11 is a view illustrating an operation of the lighting device according to the fourth embodiment.

When the operating unit is operated to switch the active element 41 OFF such that the second light source block 52 is switched from the extinguished condition to the lit condition, on the other hand, the switching control circuit 44 increases the target value Va from zero over time from an operation timing T2 of the operating unit, as shown in FIG. 11. In the active element 41, the ON resistance of the active element 41 is adjusted by feedback control such that the end-to-end voltage thereof matches the target value Va, and therefore the end-to-end voltage of the active element 41 increases in accordance with the target value Va. Note that in FIG. 11, an abscissa shows a temporal axis and an ordinate shows the target value Va.

At this time, in a condition where the ON resistance of the active element 41 is small and the end-to-end voltage of the active element 41 is lower than an operation start voltage of the second light source block 52, the entire load current flows to the active element 41. When, on the other hand, the end-to-end voltage of the active element 41 reaches the operation start voltage of the second light source block 52 in accordance with the increase in the target value Va, a part of the load current flows to the active element 41 while a current also begins to flow gradually to the second light source block 52. When the target value Va exceeds a lighting voltage (a forward voltage) of the second light source block 52, the active element 41 completes the shift to the OFF condition.

Here, an end-to-end voltage of the first light source block 51 takes a value obtained by subtracting an end-to-end voltage of the second light source block 52, or in other words the end-to-end voltage of the active element 41, from the output voltage of the power conversion circuit 2. Therefore, by having the switching circuit 4 increase the end-to-end voltage of the active element 41 comparatively gently in accordance with the target value Va, as described above, a situation in which the output voltage of the power conversion circuit 2 is insufficient relative to the operating voltage of the light source group 5 can be prevented from occurring. As a result, a reduction in the end-to-end voltage of the first light source block 51 when the active element 41 is shifted to the OFF condition can be suppressed, and therefore a current reduction (a luminous flux reduction) in the first light source block 51 can be suppressed.

Further, the switching control circuit 44 preferably sets an increase speed of the target value Va when the active element 41 is switched from the ON condition to the OFF condition to be lower than the response of the output of the power conversion circuit 2 (i.e. the variation speed of the output voltage). In other words, when the active element 41 is shifted to the OFF condition, the number of lit light source blocks increases, leading to an increase in the required load voltage. However, the output voltage of the power conversion circuit 2 cannot rise instantaneously to the load voltage, and therefore the lit light source block is momentarily extinguished (dimmed). By setting the increase speed of the target value Va to be lower than the response of the output of the power conversion circuit 2, however, the lighting device 10 can reliably prevent momentary extinguishing (dimming) of the lit light source block.

In the lighting device 10 according to the embodiment described above, the switching circuit 4 detects the end-to-end voltage of the active element 41 and then feedback-controls the end-to-end voltage by adjusting the impedance of the active element 41 such that the detected voltage matches the target value Va set by the switching control circuit 44. Here, when the active element 41 is switched ON, the switching circuit 4 gradually increases the target value Va of the end-to-end voltage of the active element 41 over time, and therefore an excessive load current can be prevented from flowing while the active element 41 shifts from the OFF condition to the ON condition.

In other words, the lighting device 10 can prevent an excessive surge current from flowing to the light source group 5 when the active element 41 shifts from OFF to ON. Further, the switching circuit 4 increases the target value Va at a gentler speed than the response of the output of the power conversion circuit 2, and therefore instability phenomena such as ringing occurring in the output of the power conversion circuit 2 when the active element 41 is switched ON can be suppressed.

Furthermore, when the active element 41 is switched OFF, the switching circuit 4 increases the end-to-end voltage of the active element 41 comparatively gently, and therefore a situation in which the output voltage of the power conversion circuit 2 is insufficient relative to the operating voltage of the light source group 5 can be prevented from occurring. As a result, a current reduction (a luminous flux reduction) in the first light source block 51 can be suppressed.

Figure 12:
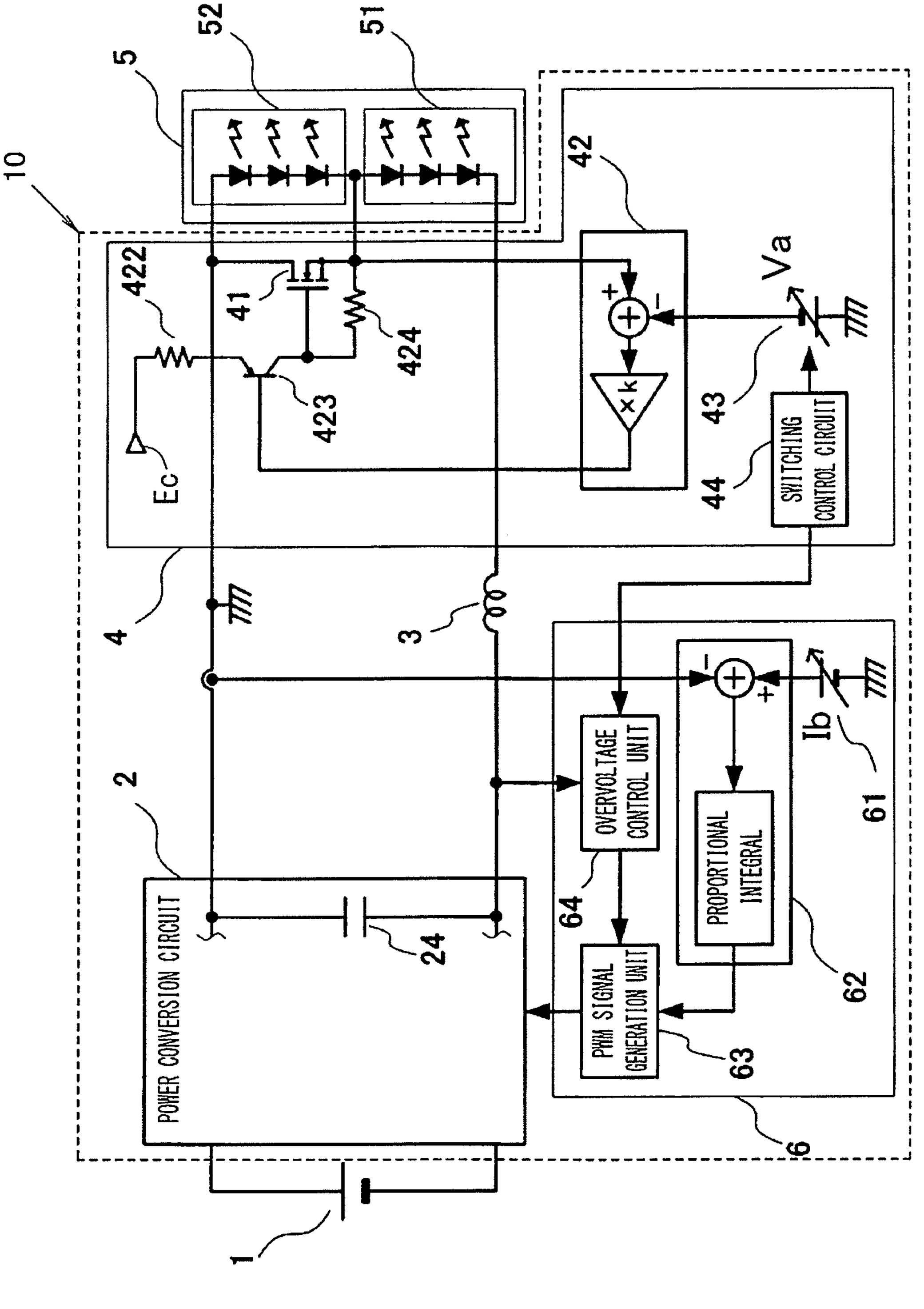
FIG. 12 is a schematic circuit diagram showing a configuration of a lighting device according to a modified example of the fourth embodiment.

As a modified example of this embodiment, as shown in FIG. 12, the lighting device 10 may be configured such that the high potential side output end of the power conversion circuit 2 is connected to the circuit ground, whereby the output of the power conversion circuit 2 serves as the negative potential side of the circuit ground.

In the example of FIG. 12, the switching circuit 4 further includes a PNP type transistor 423 that is controlled by the output of the error amplifier 42, and resistors 422, 424. Further, in the example of FIG. 12, the second light source block 52 is connected to the high potential side output (the circuit ground) of the power conversion circuit 2, and the first light source block 51 is connected to the low potential side output. The active element 41 is connected in parallel to the second light source block 52, while the drain thereof is connected to the high potential side output (the circuit ground) of the power conversion circuit 2.

A base serving as a control terminal of the transistor 423 is connected to an output end of the error amplifier 42. The transistor 423 and the resistor 422 are connected in series and inserted between the control power supply Ec and the gate of the active element 41. The resistor 424 is connected between the gate and the source of the active element 41.

Next, an operation of the lighting device 10 having the configuration shown in FIG. 12 will be described briefly.

Similarly to the configuration shown in FIG. 9, the lighting device 10 feedback-controls the end-to-end voltage of the active element 41 in accordance with the target value Va when the active element 41 is shifted from OFF to ON or from ON to OFF.

More specifically, when the end-to-end voltage of the active element 41 becomes lower (larger in terms of an absolute value) than the target value Va, the output of the error amplifier 42 decreases. When the output of the error amplifier 42 falls below the output voltage value of the control power supply Ec, a voltage obtained by subtracting the output of the error amplifier 42 and a base-emitter voltage of the transistor 423 from the output voltage value of the control power supply Ec is applied to the resistor 422. A current corresponding to this voltage flows to the resistor 424 via a collector of the transistor 423 such that a voltage generated in the resistor 424 is applied to the gate of the active element 41. Accordingly, the active element 41 operates such that the ON resistance thereof decreases, and as a result, the absolute value of the end-to-end voltage of the active element 41 decreases.

When the end-to-end voltage of the active element 41 becomes higher (smaller in terms of the absolute value) than the target value Va, on the other hand, the output of the error amplifier 42 increases. Accordingly, an emitter voltage of the transistor 423 increases, leading to a reduction in a voltage difference with the output voltage value of the control power supply Ec and a corresponding reduction in a collector current of the transistor 423. Hence, the gate voltage of the active element 41 decreases, and therefore the active element 41 operates such that the ON resistance thereof increases. As a result, the absolute value of the end-to-end voltage of the active element 41 increases.

Figure 13:
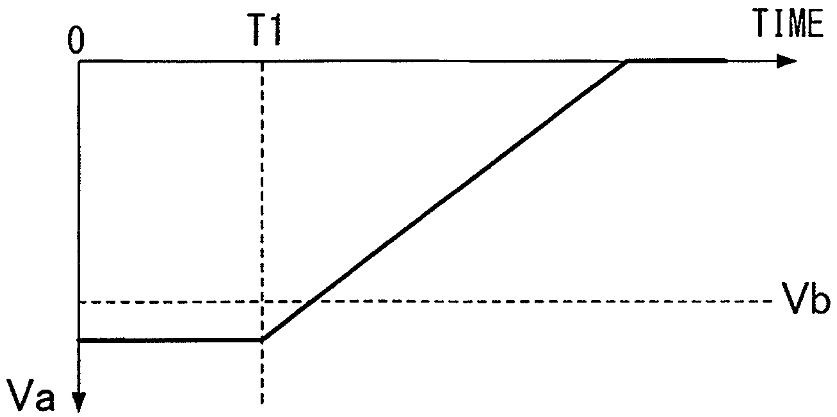
FIG. 13 is a view illustrating an operation of the lighting device according to the modified example of the fourth embodiment.
Figure 14:
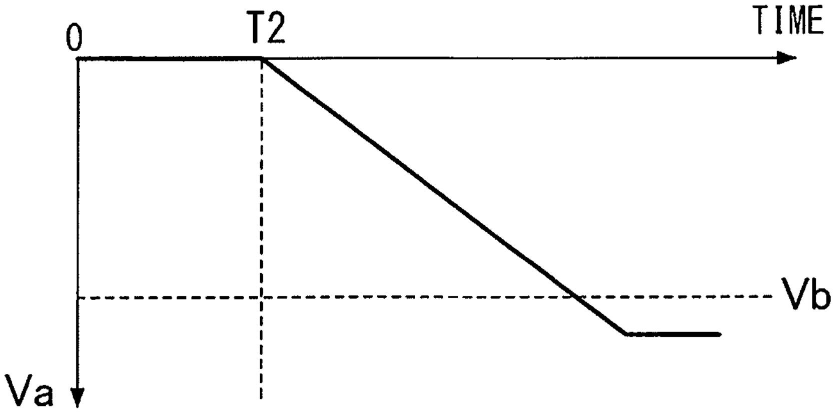
FIG. 14 is a view illustrating an operation of the lighting device according to the modified example of the fourth embodiment.

Note, however, that in the lighting device 10 shown in FIG. 12, the detected voltage (the end-to-end voltage of the active element 41) has a negative potential, and therefore the target value Va likewise has a negative potential characteristic, as shown in FIGS. 13 and 14. More specifically, when the active element 41 is switched from OFF to ON, the switching control circuit 44 increases the target value Va (a negative value) from a smaller value than the upper limit value Vb (a negative value) to zero over time from an operation timing T1 of the operating unit, as shown in FIG. 13. When the active element 41 is switched from ON to OFF, on the other hand, the switching control circuit 44 reduces the target value Va (a negative value) from zero to a smaller value than the upper limit value Vb (a negative value) over time from an operation timing T2 of the operating unit, as shown in FIG. 14. Note that in FIGS. 13 and 14, an abscissa shows a temporal axis and an ordinate shows the target value Va.

Further, the lighting device 10 shown in FIG. 12 has another function for variably controlling the upper limit value Vb of the output voltage of the power conversion circuit 2 in accordance with the ON/OFF switching operation of the active element 41. More specifically, the switching control circuit 44 is configured to output a variation signal indicating the magnitude of the upper limit value Vb to the overvoltage control unit 64.

Here, when the light source group 5 of the lighting device 10 is in a state of loose contact with the output terminal, the light source group 5 and the output terminal may come into and fall out of contact with each other repeatedly, and therefore current stress generated during contact can be reduced by reducing a voltage difference between the upper limit value Vb and the lighting voltage (the load voltage) of the light source group 5. However, a different number of light source blocks is lit depending on whether the active element 41 is ON or OFF, leading to a difference in the load voltage, and therefore, when the upper limit value Vb is constant, the voltage difference between the upper limit value Vb and the load voltage cannot be kept small. As a result, the current stress generated during contact increases. In response to this problem, the switching control circuit 44 keeps the voltage difference between the upper limit value Vb and the load voltage small by switching the upper limit value Vb when the active element 41 is switched ON or OFF.

This function for variably controlling the upper limit value Vb of the output voltage of the power conversion circuit 2 in accordance with the ON/OFF switching operation of the active element 41 is not limited to this embodiment, and may be applied to other embodiments.

Figure 15:
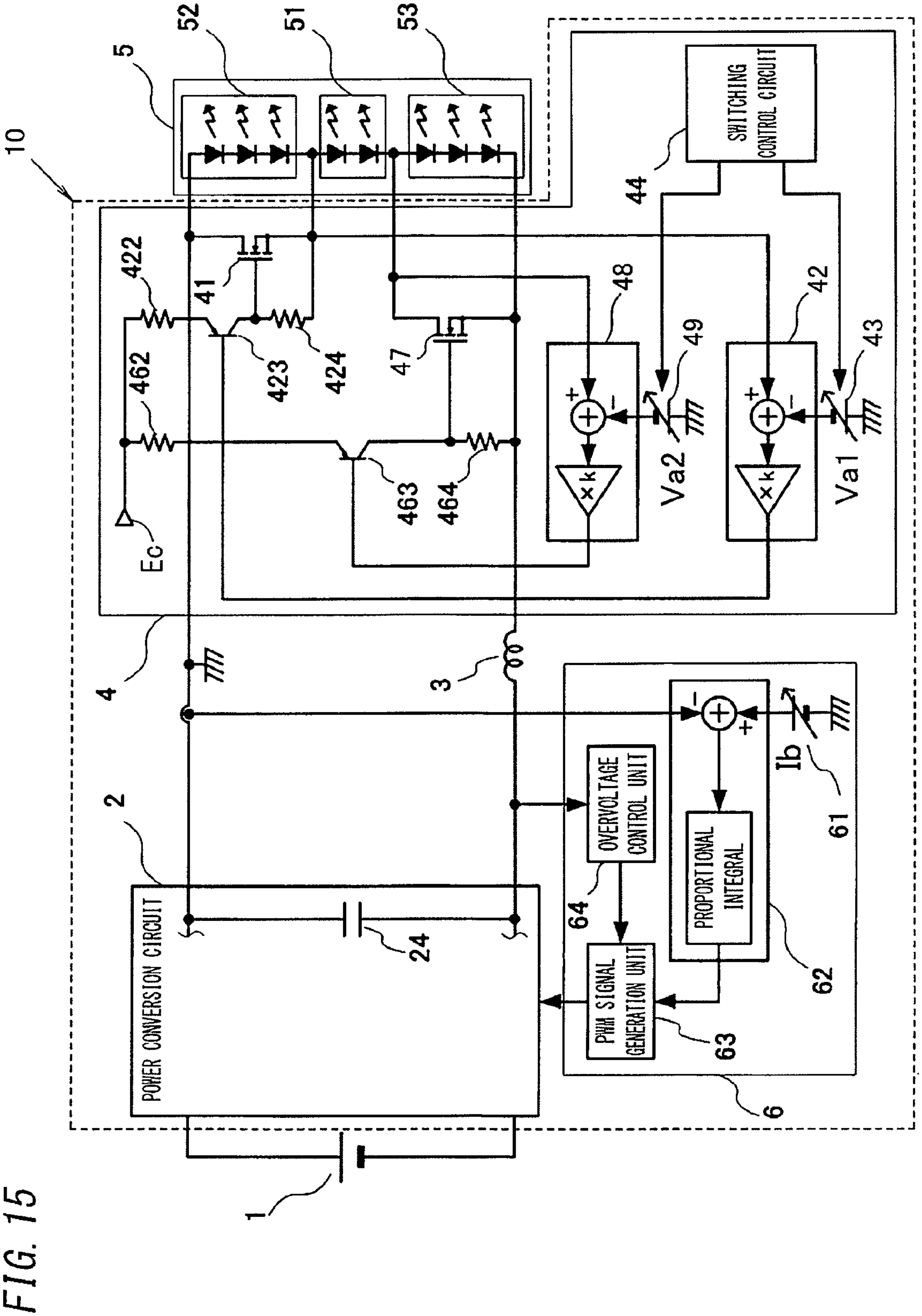
FIG. 15 is a schematic circuit diagram showing a configuration of a lighting device according to another modified example of the fourth embodiment.

FIG. 15 shows another modified example of this embodiment, in which each of the second light source block 52 and a third light source block 53, from among first to third light source blocks 51, 52, 53 connected in series, can be switched between the lit condition and the extinguished condition. The lighting device 10 shown in FIG. 15 has a similar basic configuration and similar functions to the lighting device 10 shown in FIG. 12, and therefore detailed description of this lighting device 10 will be omitted below. Note that the light source group 5 is configured such that the second light source block 52, the first light source block 51, and the third light source block 53 are connected in series in that order from the high potential output (the circuit ground) side of the power conversion circuit 2.

In the example shown in FIG. 15, the switching circuit 4 includes a plurality of active elements 41, 47, and is configured to switch the second light source block 52 between the lit condition and the extinguished condition using the active element 41 and to switch the third light source block 53 between the lit condition and the extinguished condition using the active element 47. In other words, in the switching circuit 4, one active element (a first active element) 41 is connected in parallel to the second light source block 52, and the other active element (a second active element) 47 is connected in parallel to the third light source block 53.

As constituent elements for controlling the active element 47, the switching circuit 4 includes an error amplifier 48, a target value generation unit 49, a transistor 463, and resistors 462, 464. These constituent elements correspond respectively to the error amplifier 42, the target value generation unit 43, the transistor 423, and the resistors 422, 424 for controlling the active element 41. The switching control circuit 44 outputs setting signals separately to the target value generation unit 43, which generates a target value Va1 of the end-to-end voltage of the second light source block 52, and the target value generation unit 49, which generates a target value Va2 of an end-to-end voltage of the third light source block 53.

According to this configuration, respective operations of the active elements 41, 47 are similar to those of the active element 41 having the configuration shown in FIG. 12.

All other configurations and functions are similar to the first embodiment.

(Fifth Embodiment)

Figure 16:
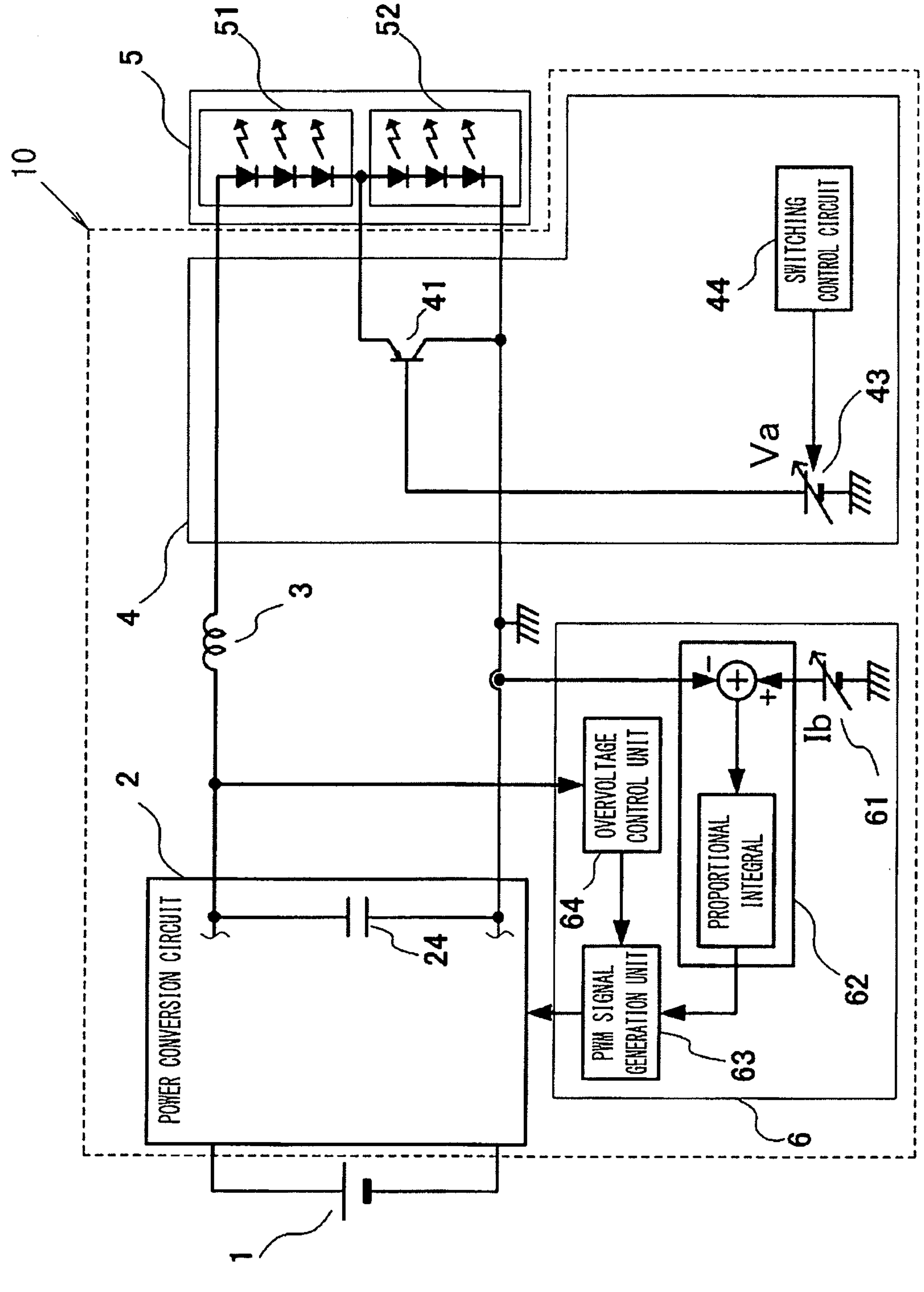
FIG. 16 is a schematic circuit diagram showing the configuration of the lighting device according to the fifth embodiment.

As shown in FIG. 16, the lighting device 10 according to this embodiment differs from the lighting device 10 according to the fourth embodiment in not having a configuration for detecting the end-to-end voltage of the active element 41 as the detection value and comparing the detection value with the target value Va. Hereafter, common reference symbols have been allocated to similar configurations to the fourth embodiment, and where appropriate, description thereof has been omitted.

In other words, the lighting device 10 according to the fourth embodiment is configured to detect the end-to-end voltage of the active element 41 and feedback-control the end-to-end voltage of the active element 41 to the target value Va, whereas the lighting device 10 shown in FIG. 16 does not perform this feedback control. In the example of FIG. 16, the lighting device 10 has an emitter follower configuration in which the active element 41 is constituted by a PNP type transistor and a base of the active element 41 is connected to the output of the target value generation unit 43. With this configuration, in the transistor serving as the active element 41, a voltage obtained by superimposing the base-emitter voltage of the transistor onto the voltage applied to the base appears as an emitter voltage.

Here, the switching control circuit 44 sets the magnitude of the target value Va applied to the base of the active element 41 in a similar manner to the fourth embodiment. In other words, when the second light source block 52 is lit and the active element 41 is OFF, the switching control circuit 44 sets the target value Va at a value no smaller than the preset upper limit value Vb of the output voltage of the power conversion circuit 2. When the active element 41 is switched ON in order to extinguish the lit second light source block 52, on the other hand, the switching control circuit 44 varies the target value Va such that the target value Va decreases gradually over time (see FIG. 10). When the active element 41 is switched OFF in order to shift the second light source block 52 from the extinguished condition to the lit condition, the switching control circuit 44 increases the target value Va from zero over time (see FIG. 11).

Hence, with the lighting device 10 according to this embodiment, an excessive surge current can be prevented from flowing to the light source group 5 when the active element 41 is shifted from OFF to ON. Further, when the active element 41 is switched OFF, the lighting device 10 increases the end-to-end voltage of the active element 41 comparatively gently, and therefore a situation in which the output voltage of the power conversion circuit 2 is insufficient relative to the operating voltage of the light source group 5 can be prevented from occurring. As a result, a current reduction (a luminous flux reduction) in the first light source block 51 can be suppressed.

Note that in the example of FIG. 16, a transistor is used as the active element 41, but the lighting device 10 is not limited to this configuration and may employ a configuration in which another element such as a FET is used as the active element 41, a voltage follower circuit configuration in which an operational amplifier circuit such as an op-amp is combined with the active element 41, and so on.

Figure 17:
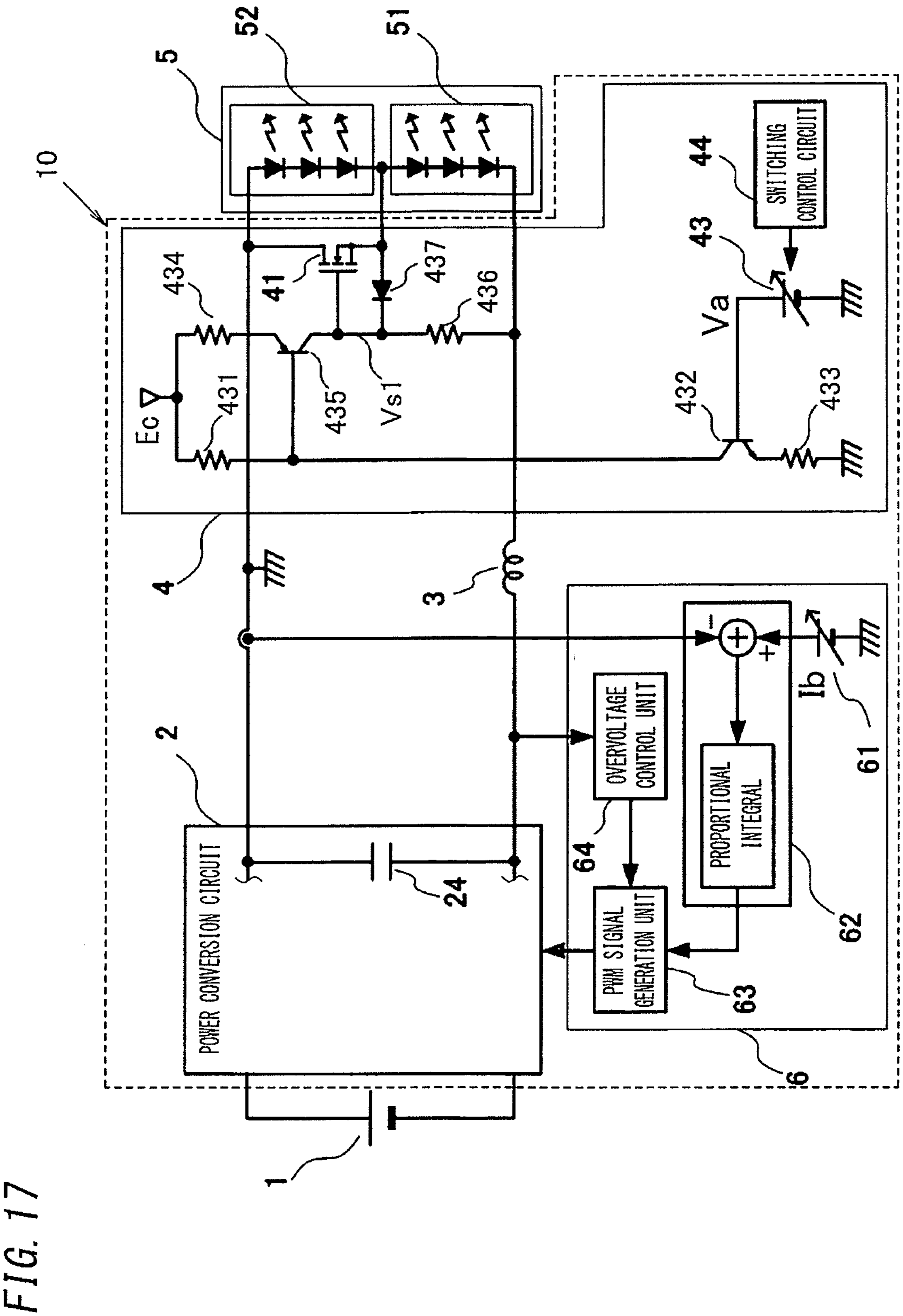
FIG. 17 is a schematic circuit diagram showing a configuration of a lighting device according to a modified example of the fifth embodiment.

As a modified example of this embodiment, as shown in FIG. 17, the lighting device 10 may be constructed using a MOSFET as the active element 41.

In the example of FIG. 17, the high potential side output end of the power conversion circuit 2 is connected to the circuit ground such that the output of the power conversion circuit 2 is on the negative potential side of the circuit ground. In this case, a P channel type MOSFET may be used as the active element 41 of the lighting device 10, but in FIG. 17, an N channel type MOSFET having a favorable ON resistance characteristic is employed as the active element 41. Further, in the example of FIG. 17, the second light source block 52 is connected to the high potential side output (the circuit ground) of the power conversion circuit 2, and the first light source block 51 is connected to the low potential side output. The active element 41 is connected in parallel to the second light source block 52, while the drain thereof is connected to the high potential side output (the circuit ground) of the power conversion circuit 2.

In the switching circuit 4 shown in FIG. 17, a series circuit including a resistor 431, an NPN type transistor 432, and a resistor 433 is provided between the control power supply Ec and the circuit ground. A base serving as a control terminal of the transistor 432 is connected to the output of the target value generation unit 43. A collector of the transistor 432 is connected to the control power supply Ec via the resistor 431, and an emitter is connected to the circuit ground via the resistor 433.

Further, a series circuit including a resistor 434, a PNP type transistor 435, and a resistor 436 is provided in the switching circuit 4 between the control power supply Ec and the low potential side output end of the power conversion circuit 2. A base serving as a control terminal of the transistor 435 is connected to the collector of the transistor 432. An emitter of the transistor 435 is connected to the control power supply Ec via the resistor 434, and a collector is connected to the low potential side output end of the power conversion circuit 2 via the resistor 436.

The FET serving as the active element 41 constitutes a source follower circuit in which the drain thereof is connected to the high potential side output (the circuit ground) of the power conversion circuit 2 and the source thereof is connected to the connecting point between the light source blocks 51, 52. Note that a diode 437 is inserted between the source of the active element 41 and the collector of the transistor 435.

Next, an operation of the lighting device 10 configured as shown in FIG. 17 will be described.

In the case of a source follower circuit, a source voltage of the FET is adjusted in accordance with a gate voltage. In FIG. 17, the gate of the active element 41 is connected to the low potential output (a negative potential) of the power conversion circuit 2 via the resistor 436 such that when a current flowing through the resistor 436 is substantially zero, the output (a negative potential) of the power conversion circuit 2 is applied to the gate, whereby a reverse bias is obtained as the gate voltage. Accordingly, the FET serving as the active element 41 is maintained in the OFF condition, whereby the second light source block 52 is maintained in the lit condition.

When the target value Va increases from substantially zero, on the other hand, a voltage corresponding to the target value Va is applied to the base of the transistor 432, whereby a current corresponding to the target value Va flows to the resistor 433 connected to the emitter. Further, a substantially equal current to that of the resistor 433 flows to the resistor 431, with the result that a voltage drop corresponding to the target value Va occurs in the resistor 431. A voltage obtained by subtracting the voltage drop of the resistor 431 from the control power supply Ec is applied to the base of the transistor 435, while a voltage (an emitter voltage) that is higher than the base voltage by an amount corresponding to the base-emitter voltage is generated in the emitter.

As a result, a current corresponding to a difference between the output of the control power supply Ec and the emitter voltage of the transistor 435 flows to the resistor 434 connected to the emitter of the transistor 435. Further, a substantially equal current to the current flowing to the resistor 434 flows to the resistor 436 via the collector of the transistor 435 such that a voltage drop corresponding to the current is generated in the resistor 436. In short, a voltage generated in the resistor 436 is commensurate with the target value Va.

Here, the gate voltage of the active element 41 is a voltage obtained by superimposing an end-to-end voltage of the resistor 436 onto the output voltage (a negative potential) of the power conversion circuit 2, and therefore the gate voltage of the active element 41 increases when the target value Va increases. In the active element 41, when a gate voltage Vs1 increases beyond a potential of the connecting point between the light source blocks 51, 52 by an amount corresponding to the threshold voltage of the gate voltage, the impedance starts to decrease so that the source voltage falls below a gate voltage by an amount corresponding to the threshold voltage. When the target value Va increases further such that the gate voltage increases to a value no smaller than the threshold voltage of the active element 41 relative to the circuit ground, the FET serving as the active element 41 is switched completely ON and the load current flows mainly to the active element 41 such that the second light source block 52 is extinguished.

When the second light source block 52 is to be shifted from the extinguished condition to the lit condition, the target value Va is gradually reduced, whereby, in the active element 41, the gate voltage decreases such that the impedance is increased to a source voltage based thereon. As a result, the load current starts to flow to the second light source block 52. When the target value Va is reduced further, the active element 41 is switched completely OFF, whereby the second light source block 52 is lit.

All other configurations and functions are similar to the fourth embodiment.

Figure 18:
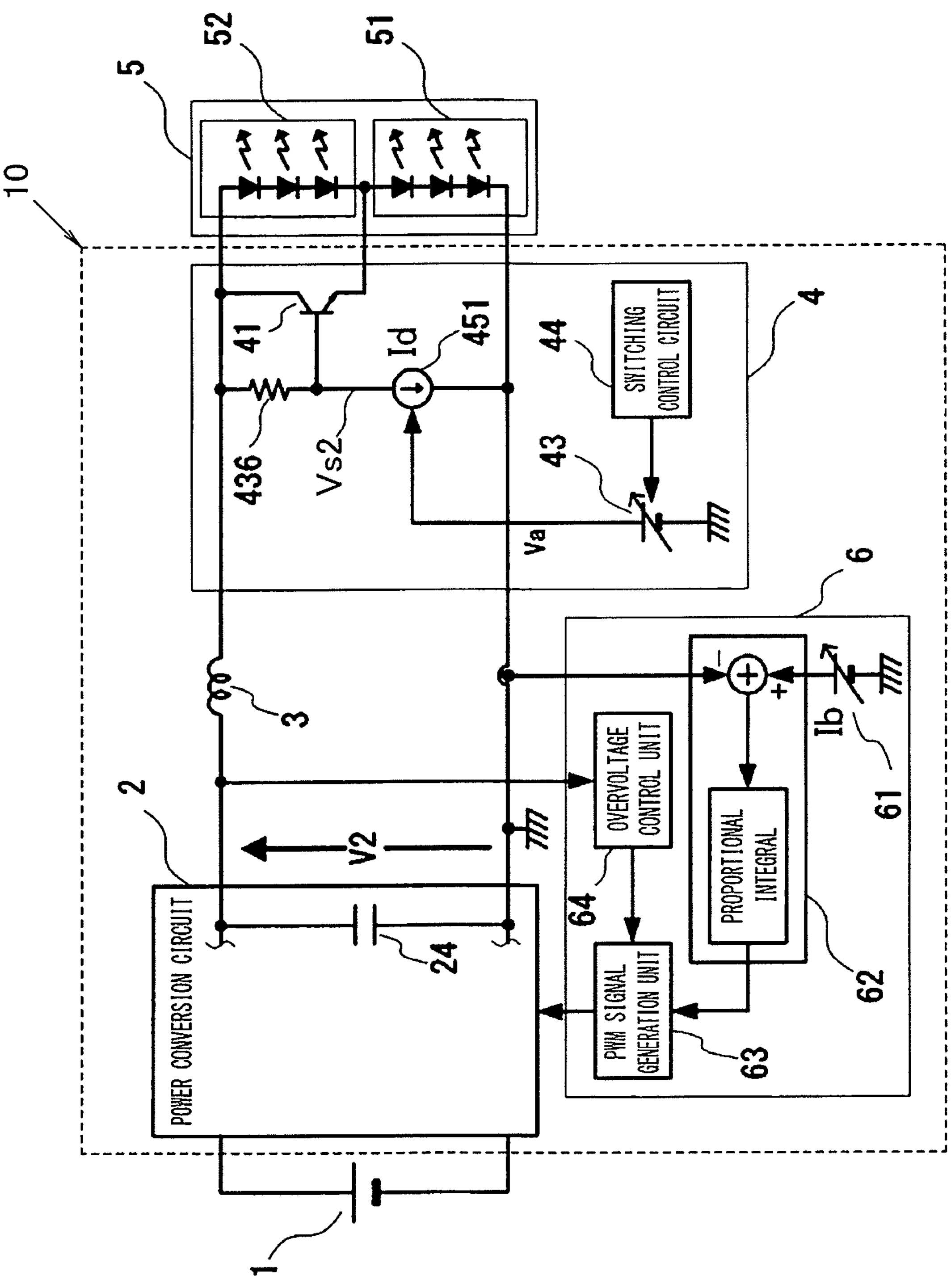
FIG. 18 is a schematic circuit diagram showing a configuration of a lighting device according to another modified example of the fifth embodiment.

In addition, as a modified example of this embodiment, a lighting device 10 may be configured, as shown in FIG. 18.

In the example of FIG. 16, the active element 41 is connected in parallel to the light source block ("the second light source block 52" in FIG. 16) of the low potential side near the circuit ground. On the other hand, in the example of FIG. 18, the active element 41 is connected in parallel to the light source block ("the first light source block 51" in FIG. 18) of the high potential side. In the example of FIG. 18, the active element 41 is an NPN type transistor, and the lighting device 10 controls ON or OFF of the second light source block 52 because an emitter of the active element 41 is connected to the connection point between the light source blocks 51, 52.

In the example of FIG. 18, the high potential side output end of the power conversion circuit 2 is connected to the base serving as the control terminal of the active element 41 through the resistor 436, and the current signal source 451 is connected between the base of the active element 41 and the circuit ground. The current Id output from the current signal source 451 is a current to be proportionate to the target value Va being a voltage signal of the target value generation unit 43.

The transistor as the active element 41 constitutes the emitter follower circuit in which the base thereof is connected to the output of the target value generation unit 43, in other words the current signal source 451. According to this configuration, an emitter voltage of the transistor as the active element 41 shows up as a voltage to be lower than a base voltage by a base-emitter voltage.

When a current of the current signal source 451 is set as Id, a resistance of the resistor 436 is set as R436, and an output voltage of the power conversion circuit 2 is set as V2, the base voltage of the active element 41 becomes Vs2=V2−R436×Id. When the current Id is small and substantially zero, the output voltage V2 of the power conversion circuit 2 is applied to the base of the active element 41 without change. And when base-emitter voltage of the active element 41 is ignored, the voltage that substantially equals the output voltage V2 of the power conversion circuit 2 shows up the emitter of the active element 41, or in other words, the active element 41 is in the ON condition, and the second light source block 52 is shifted to the extinguished condition.

In a case where the second light source block 52 is lit, when the switching control circuit 44 increases the target value Va gradually, the current Id of the current signal source 451 increases gradually, and thus a voltage drop at the resistor 436 increases gradually. On the other hand, the lighting device 10 controls the constant voltage type load such as an LED in constant current control. Therefore, the end-to-end voltage of the first light source block 51 is substantially stable. As a result, the emitter voltage of the active element 41 is substantially stable.

The emitter voltage of the active element 41 equals the base voltage of the active element 41 substantially, a voltage difference generated by voltage drop at the resistor 436 is generated between the base voltage Vs2 of the active element 41 and the output voltage V2 of the power conversion circuit 2. The collector of the active element 41 is connected to the high potential side output end the power conversion circuit 2, when the impedance of the active element 41 becomes high, the voltage that equals the voltage difference of the voltage drop at the resistor 436 substantially is generated between collector-emitter of the active element 41. As a result, this voltage is applied to the second light source block 52, the active element 41 is switched from the ON condition to the OFF condition.

And, when the target Va increases further, and the voltage difference generated by the voltage drop at the resistor 436 is higher than the light voltage of the second light source block 52, the active element 41 is set the OFF condition absolutely, the second light source block 52 completes switching to the lit condition.

On the other hand, in a case where the second light source block 52 is extinguished, when the switching control circuit 44 decreases the target value Va gradually, the current Id of the current signal source 451 decreases gradually. Therefore, the voltage drop at the resistor 436 decreases gradually. The impedance of the active element 41 decreases gradually. As a result, the active element 41 is switched from the OFF condition to the ON condition, the end-to-end voltage of the second light source block 52 decreases, the second light source block 52 is switched to the extinguished condition.

Note that, in FIG. 18, the resistor 436 is connected to the high potential side output end of the power conversion circuit 2, a power supply, which outputs a voltage higher by at least a base-emitter voltage of the transistor serving as the active element 41, may be superimposed on the high potential side output end, and be connected to the resistor 436. In this case, it is effective in the loss reduction in the ON condition of the active element 41.

Figure 19:
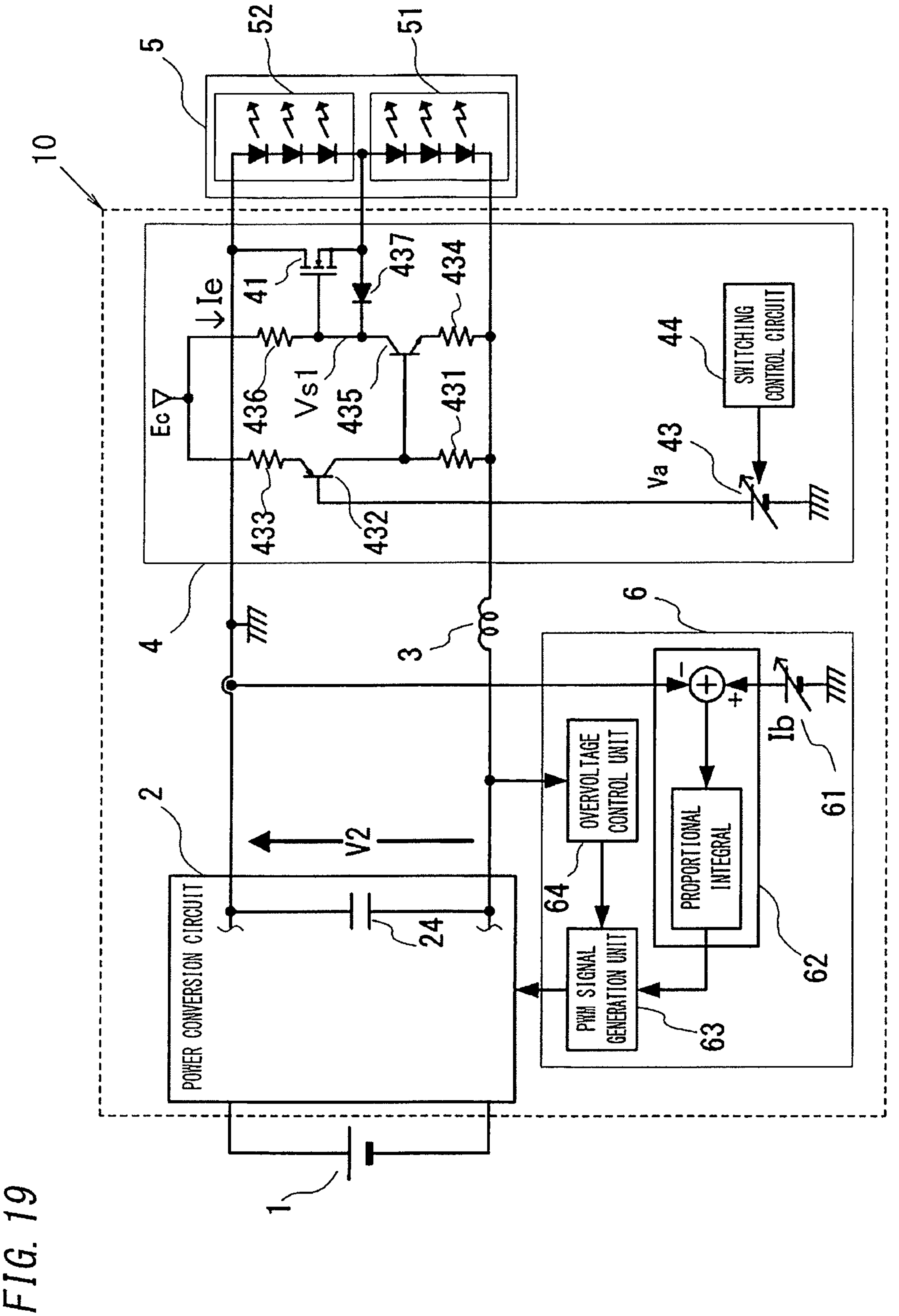
FIG. 19 is a schematic circuit diagram showing a configuration of a lighting device according to another modified example of the fifth embodiment.

Next, as a modified example of this embodiment, a lighting device 10 shown in FIG. 19 is described.

In the example of FIG. 19, an active element 41 is an N-channel type MOSFET, and the FET serving as the active element 41 constitutes a source follower circuit in which the drain thereof is connected to the circuit ground side output end of the power conversion circuit 2 and the source thereof is connected to the connecting point between the light source blocks 51, 52. In addition, the high potential side output end of the power conversion circuit 2 is connected to the circuit ground such that the output of the power conversion circuit 2 has a negative potential for the circuit ground.

In the example of FIG. 19, a current signal source is configured from a transistor 435 and a resistor 434. When a base-emitter voltage of the transistor 435 is ignored, a base voltage of the transistor 435 is applied to the resistor 434 that is connected to the emitter of the transistor 435. The current which is substantially equal to the current flowing to the resistor 434 by an emitter voltage of the transistor 435 flows to the collector of the transistor 435.

The target value (a voltage signal) Va generated by the target value generation unit 43 is applied to the base of the transistor 432, and a voltage difference between the emitter voltage which substantially equals the base voltage of the transistor 432 and the output voltage of the control power supply Ec is applied to the resistor 433. This voltage difference is applied to the resistor 433. Therefore, the current flows from emitter of the transistor 432 to the collector thereof, and the current is provided to the resistor 431. As a result, the current to be proportionate to the target value Va flows to the resistor 436. The lower the target value Va for the output voltage of the control power supply Ec is, the higher this current becomes. On the other hand, when the target value Va equals or exceeds the output voltage of the control power supply Ec, this current becomes substantially zero.

When the target value Va substantially equals the output voltage of the control power supply Ec, because the current from the control power supply Ec is substantially zero, a gate voltage Vs1 of the FET as the active element 41 substantially equals the output voltage of the control power supply Ec. As a result, the FET serving as the active element 41 is shifted to the ON condition absolutely, the second light source block 52 becomes the extinguished condition.

On the other hand, when the target value Va is lower than the output voltage of the control power supply Ec, the current to be proportionate to a voltage difference between the output voltage of the control power supply Ec and the target value Va flows as a collector current of the transistor 432. And, a voltage generated in the resistor 431 by this collector current is generated in an emitter of the transistor 435. Further, in the collector of the transistor 435, or in other words in the resistor 436, a current Ie corresponding to the emitter voltage of the transistor 435 and a resistance of the resistor 434 flows as an output current of the current signal source. When the output voltage of the control power supply Ec is set as Vc and the resistance of the resistor 436 is set as R436, the gate voltage of the active element 41 becomes Vs1=Vc−R436×Ie. The current Ie is proportionate to the target value Va.

Next, the operation of the lighting device 10 of the example of FIG. 19 is described.

First, in a case where the second light source block 52 is lit, when the switching control circuit 44 decreases the target value Va gradually, a voltage difference between the target value Va and the output voltage of the control power supply Ec increases gradually. Therefore, the collector voltage of the transistor 432 increases gradually. Further, the collector current of the transistor 435, or in other words the current Ie increases gradually. A voltage drop at the resistor 436 increases with the increase in the current Ie. Therefore, the gate voltage Vs1 of the active element 41 decreases.

When the threshold voltage is set as Vth, the source voltage of the active element 41 becomes Vs1−Vth. In addition, the source voltage of the active element 41 equals the end-to-end voltage of the second light source block 52.

Therefore, when the gate voltage Vs1 decreases with reduction in the target value Va, the impedance of the active element 41 increases. As a result, the source voltage of the active element decreases (increase at a negative potential level), the end-to-end voltage of the second light source block 52 increases, and the second light source block 52 starts to light. When the load voltage of the second light source block 52, or in other words the end-to-end voltage is set as V52 and the gate voltage Vs1 decreases to (Vth−V52) or less, the active element 41 is shifted to the OFF condition absolutely, and the second light source block 52 is lit.

On the other hand, in a case where the second light source block 52 is extinguished, when the switching control circuit 44 increases the target value Va gradually, a voltage difference between the target value Va and the output voltage of the control power supply Ec decreases gradually. Therefore, the collector current of the transistor 432 decreases gradually. Further, the collector current of the transistor 435, or in other words the current Ie decreases gradually. The voltage drop at the resistor 436 becomes small with a reduction in the current Ie. Therefore, the gate voltage Vs1 of the active element 41 relatively increases from a predetermined negative potential determined by the end-to-end voltage of the second light source block 52.

The source voltage of the active element 41 is Vs1−Vth. Therefore, when the gate voltage Vs1 increases with an increase in the target value Va, the impedance of the active element 41 decreases. As a result, the current starts to flow to the active element 41. And, when the gate voltage Vs1 exceeds the threshold voltage Vth, the active element 41 is shifted to the ON condition absolutely, and the second light source block 52 is extinguished.

The diode 437 is provided to prevent that a reverse voltage exceeding a withstand voltage is applied to the gate of the FET serving as the active element 41.

Figure 20:
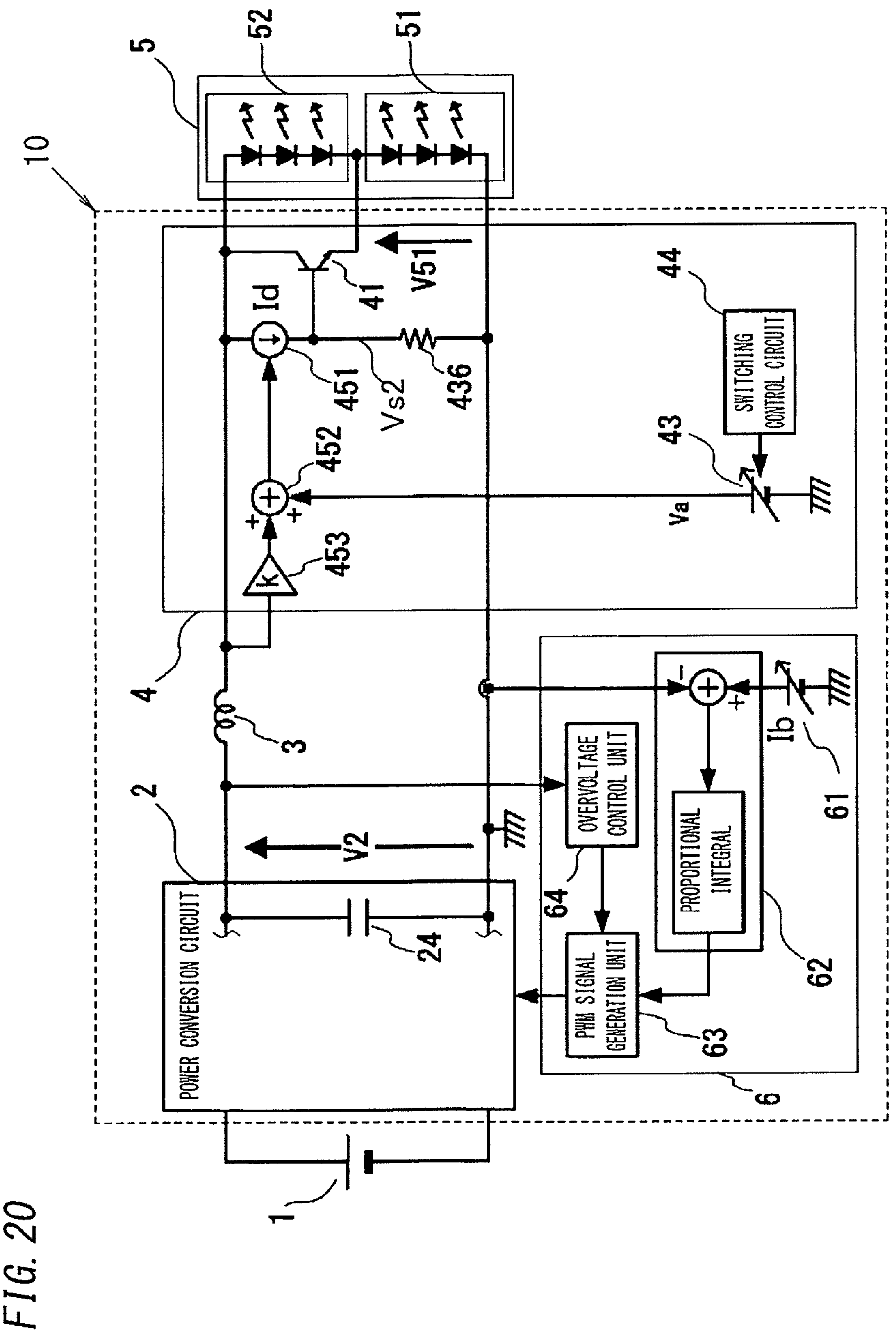
FIG. 20 is a schematic circuit diagram showing a configuration of a lighting device according to another modified example of the fifth embodiment.

Next, as a modified example of this embodiment, a lighting device 10 shown in FIG. 20 is described.

The lighting device 10 of FIG. 20 has the constitution that positions of the resistor 436, which changes the current signal to the voltage signal, and the current signal source 451, which adjusts a control voltage applied to the base serving as the control terminal of the active element 41, are reversed each other for the lighting device 10 of FIG. 18.

The current Id in FIG. 20 is adjusted by the target value (a voltage signal) Va of the target value generation unit 43 and the output voltage V2 of the power conversion circuit 2. In other words, when the output voltage V2 increases, the current Id increases. On the other hand, when the output voltage V2 decreases, the current Id decreases.

An adder 452 adds the voltage obtained by multiplying the output voltage V2 by k to the target value Va, and outputs the additional value as an adjustment signal to the current signal source 451. The current signal source 451 provides to the resistor 436 the current that is converted with a conversion coefficient α1 for the adjustment signal.

When the base-emitter voltage of the transistor serving as the active element 41 is ignored, the base voltage Vs2 of the active element 41 substantially equals the emitter voltage. Therefore, the voltage applied to the resistor 436 substantially equals the end-to-end voltage V51 of the first light source block 51. In addition, the output of the power conversion circuit 2 becomes a constant current output to light the LED load light stability, and to light the first light source block 51 always, the end-to-end voltage V51 of the first light source block 51 becomes a substantially constant voltage. Therefore, when the resistance of the resistor 436 is set as R436, the end-to-end voltage of the first light source block 51 becomes V51=α1×(Va+k×V2)×R436. And, the output voltage V2 becomes V2=[(V51/R436)−α1×Va]/(α1×k).

The collector-emitter voltage of the active element 41, or in other words the end-to-end voltage of the second light source block 52 is V2−V51. The end-to-end voltage V51 of the first light source block 51 is in substantially a constant voltage condition. Therefore, the collector-emitter voltage of the active element 41 is capable of being proportional to the target value Va.

Therefore, by increasing the target value Va gradually, the output voltage V2 of the power conversion circuit 2 is capable of decreasing proportionally to the target value Va gradually. The end-to-end voltage of the second light source block 52 is decreased by the voltage same as the amount of decrease in the output voltage V2. By increasing the target value Va further, the active element 41 becomes the ON condition absolutely, and the second light source block 52 is capable of being shifted to the extinguished condition.

On the other hand, by decreasing the target value Va gradually, the end-to-end voltage of the second light source block 52 is capable of increasing gradually, and the second light source block 52 is capable of being shifted to the lit condition.

Figure 21:
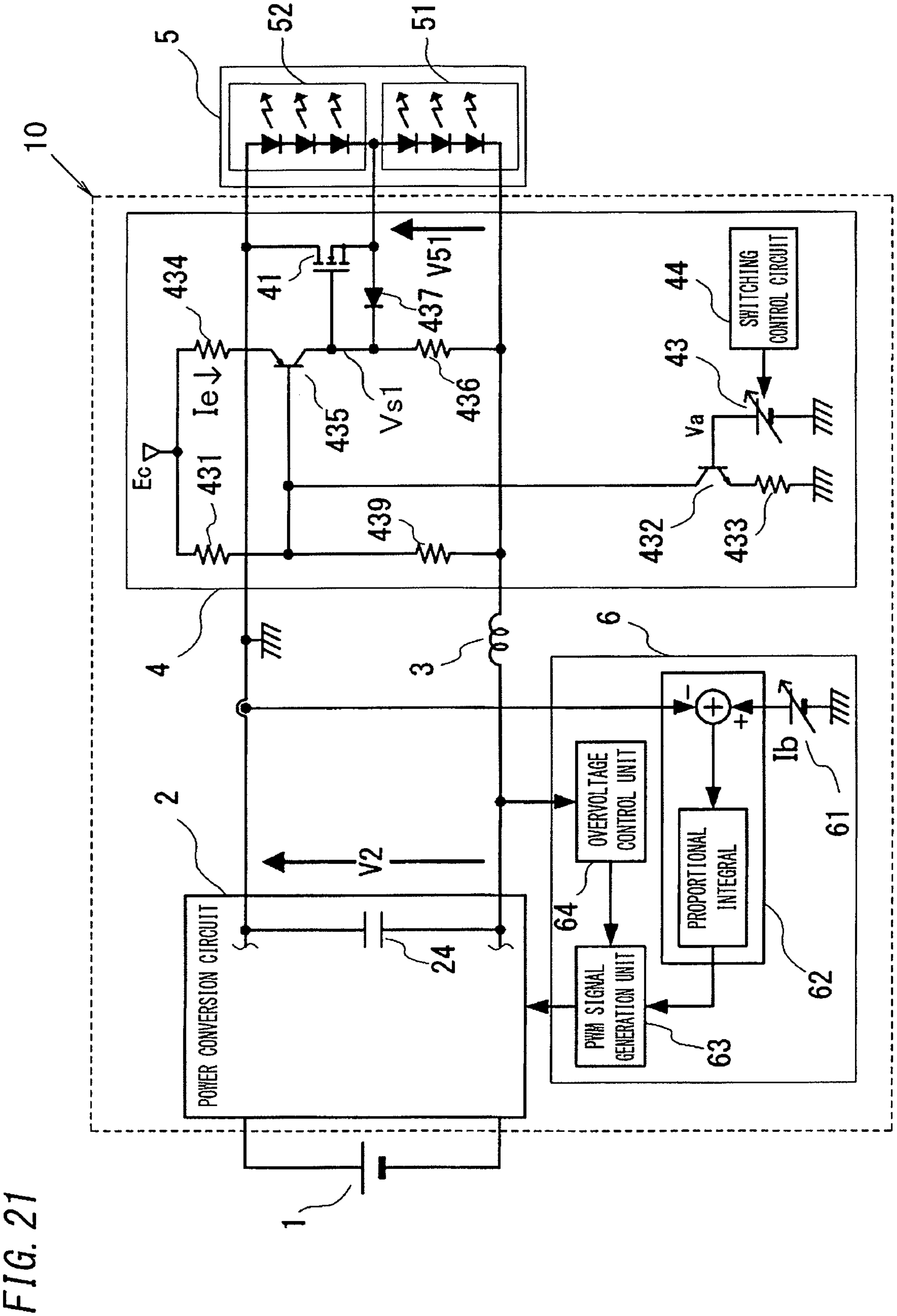
FIG. 21 is a schematic circuit diagram showing a configuration of a lighting device according to another modified example of the fifth embodiment.

Next, as a modified example of this embodiment, a lighting device 10 shown in FIG. 21 is described.

In an example of FIG. 21, the active element 41 is an N channel type MOSFET, and the FET serving as the active element 41 is configured a source follower circuit in which a drain thereof is connected to the circuit ground side output end of the power conversion circuit and a source thereof is connected to the connecting point between the light source blocks 51, 52. In addition, the high potential side output end of the power conversion circuit 2 is connected to the circuit ground such that the output of the power conversion circuit 2 has a negative potential for the circuit ground. In addition, the example of FIG. 21 has the constitution that positions of the transistor 435, which operates as the current signal source, and the resistor 436, which changes a current signal to a voltage signal, are reversed each other for the example of FIG. 19.

In a case where the base-emitter voltage of the transistor 435 is ignored, and the transistor 435 is an ideal transistor whose current amplification rate is infinite, when a voltage difference between the base voltage of transistor 435 and the output voltage of the control power supply Ec is applied to the resistor 434, the current based on this voltage difference is output as the current Ie from the collector of the transistor 435. The base voltage of the transistor 435 is determined by an amount of a voltage drop generated by the current flowing to the resistor 431. When the resistance of the resistor 431 is set as R431, and the resistance of the resistor 439 is set as R439, the current flowing to the resistor 431 becomes a current obtained by superimposing the current (Va/R433)×[R439/(R431+R439)] flowing to the resistor 431 among the collector current of the transistor 432 on the current (Vc−V2)/(R431+R439) flowing to the resistor 431 and the resistor 439 by the voltage difference between the output voltage of the control power supply Ec and the output voltage V2 of the power conversion circuit 2. The current Ie becomes (R431/R434) times as much as the current flowing to the resistor 431.

In the example of FIG. 21, when the target value Va increases, the current Ie increases in proportion to the target value Va, and when the output voltage V2 decreases, the current Ie decreases.

The active element 41 has the source follower circuit configuration. Therefore, a voltage obtained by superimposing the threshold voltage Vth of the active element 41 on the end-to-end voltage V51 of the first light source block 51 is applied to the resistor 436. Therefore, when the threshold voltage is set as Vth, the resistance of the resistor 431 is set as R431, the resistance of the resistor 433 is set as R433, the resistance of the resistor 434 is set as R434, the resistance of the resistor 436 is set as R436, and the resistance of the resistor 439 is set as R439, the gate voltage of the active element 41 becomes Vs1=V51+Vth=Ie×R436=R436×(R431/R434)×[(Vc−V2)+R439×(Va/R433)]/(R431+R439). And, the output voltage of the power conversion circuit 2 becomes $V2=(V51+Vth)\times(R434/R436)\times(1+R439/R431)-Va\times(R439/R433)-Vc$. The end-to-end voltage V51 of the first light source block 51 is a substantially constant voltage. Therefore the output voltage V2 the power conversion circuit 2 is proportional to the target value Va.

The end-to-end voltage of the second light source block 52 is determined by V2−V51, thereby varying in accordance with a variation of the output voltage V2 of the power conversion circuit 2. Therefore, in the example of FIG. 21, as like the example of FIG. 20, the end-to-end voltage of the second light source block 52 is capable of being adjusted by the target value Va. By increasing the target value Va by the switching control circuit 44, the active element 41 is shifted to the ON condition absolutely, the second light source block 52 is capable of being shifted to the extinguished condition. On the other hand, by decreasing the target value Va by the switching control circuit 44 gradually, the end-to-end voltage of the second light source block 52 is capable of increasing gradually, and the second light source block 52 is capable of being shifted to the lit condition.

In the respective embodiments described above, a proportional control circuit that multiplies the error by k is used as the error amplifier for controlling the active element. The present invention is not limited to this configuration, however, and to improve the stability of the control voltage of the active element when maintained in the ON condition or the OFF condition, the error amplifier may be constructed using a proportional integral control circuit incorporating an integration circuit, for example. The error amplifier may also be constructed using a proportional integral differential control circuit incorporating both an integration circuit and, to suppress current variation during ON/Off switching of the active element even further, a differentiation circuit.

Note that the configurations disclosed in the above embodiments are merely examples, and may be modified as desired as long as functions and operations thereof remain conceptually identical. For example, in the above embodiments, an LED is cited as an example of the solid state light source used in the light source group, but a solid state light source such as direct current-driven organic electro luminescence (EL) may be used instead.

Figure 22:
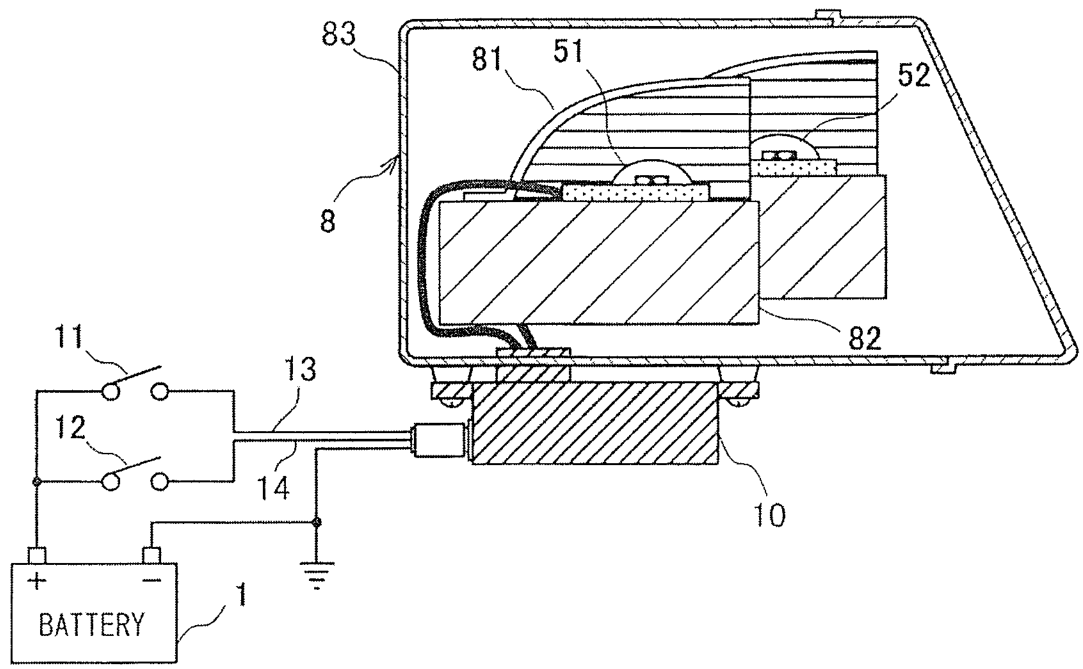
FIG. 22 is a sectional view showing a vehicle headlamp employing the aforesaid lighting device.

Incidentally, the lighting device 10 described in each of the above embodiments is used as a lamp such as a vehicle headlamp, for example. In a vehicle headlamp 8, as shown in FIG. 22, a heat radiating body 82 installed with the light source blocks 51, 52 and a reflector plate 81 that controls a distribution of an optical output of the light source blocks 51, 52 are housed in a lamp main body 83, and the lighting device 10 is disposed on a lower surface of the lamp main body 83. The lighting device 10 is operated by power supplied thereto from an in-vehicle battery serving as the direct current power supply 1 via a power line 13.

Here, a power supply switch 11 for switching the power supply to the lighting device 10 ON and OFF is provided on the power line 13, which is connected to a positive electrode output of the direct current power supply 1. Further, a switching switch 12 serving as the operating unit that lights and extinguishes the second light source block 52 by switching the active element 41 ON and OFF is provided on a signal line 14 connecting the positive electrode output of the direct current power supply 1 to the lighting device 10. In other words, the signal line 14 is connected to the switching control circuit 44 of the switching circuit 4, and the switching circuit 4 operates to switch the active element 41 ON and OFF in accordance with the ON/OFF condition of the switching switch 12.

In the vehicle headlamp 8, the first light source block 51 functions as a passing headlamp (a low beam) and the second light source block 52 functions as a driving headlamp (a high beam). Therefore, by switching the second light source block 52 between the lit condition and the extinguished condition in response to an operation of the switching switch 12, the lighting device 10 can switch between only the passing headlamp and both of the passing headlamp and the driving headlamp. The lighting device 10 according to each of the above embodiments can be applied favorably as a lighting device that switches between these two distribution patterns, namely a distribution pattern of only the passing headlamp and a distribution pattern of the combination of the passing headlamp and the driving headlamp. Note that the vehicle headlamp 8 is not limited to these two distribution patterns, namely the distribution pattern of the passing headlamp and the distribution pattern of the combination of the passing headlamp and the driving headlamp, and depending on the vehicle, may include an additional distribution pattern corresponding to a different driving condition.

Figure 23:
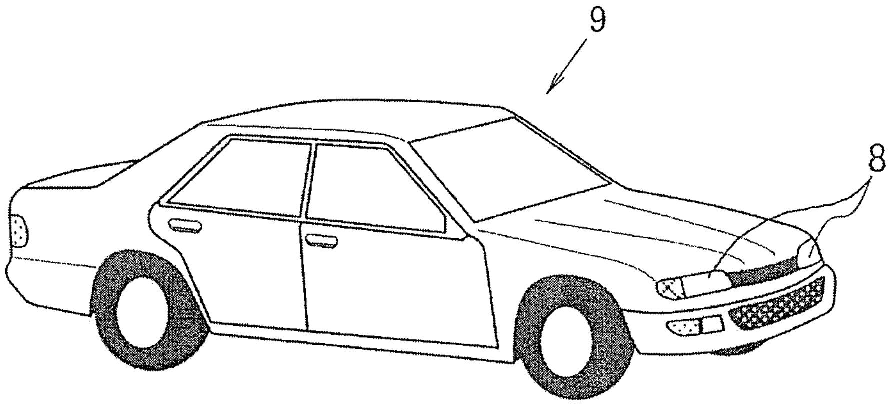
FIG. 23 is an external perspective view showing a vehicle using the aforesaid vehicle headlamp.

FIG. 23 is an external perspective view showing a vehicle 9 installed with the vehicle headlamps 8 described above in a left-right pair. Note that the lamp employing the lighting device 10 is not limited to the vehicle headlamp 8, and may be a tail lamp or the like of the vehicle 9, or another lamp.

Several preferred embodiments of the present invention were described above, but various amendments and modifications may be implemented by a person skilled in the art without departing from the original spirit and scope of the present invention, or in other words without departing from the claims.

What is claimed is:

1. A lighting device comprising:

a power supply circuit that supplies a constant current to a light source group in which a first light source block and a second light source block are connected in series; and a switching circuit that includes an active element connected in parallel to the second light source block, and extinguishes the second light source block by applying a current to the active element such that the current bypasses the second light source block, wherein the active element includes a control terminal, has an impedance that can be varied in accordance with a control signal input into the control terminal, and lights the second light source block when the impedance reaches or exceeds a predetermined value, and the switching circuit includes:

a control unit that controls the impedance of the active element such that a current flowing through the active element or an end-to-end voltage of the active element matches a target value; and a switching control circuit that sets the target value and to monotonically increase or reduce the target value so that the current flowing through the active element monotonically increases or reduces over time at a rate based on the target value.

2. The lighting device according to claim 1, wherein the control unit detects the current flowing through the active element or the end-to-end voltage of the active element as a detection value, and feedback-controls the current or the end-to-end voltage serving as the detection value by controlling the impedance of the active element such that the detection value matches the target value.

3. The lighting device according to claim 2, wherein, when the second light source block is shifted from a lit condition to an extinguished condition, the switching control circuit increases the target value of the current flowing through the active element over time at a predetermined time constant from a value thereof when the active element is OFF to a value thereof when the active element is ON, and the control unit varies the impedance of the active element as the target value increases.

4. The lighting device according to claim 2, wherein, when the second light source block is shifted from a lit condition to an extinguished condition, the switching control circuit sets the target value of the current flowing through the active element at a predefined value which is larger than a load current flowing through the first light source block when the light source group is lit in a steady state and smaller than a maximum allowable current of the light source group, and the control unit varies the impedance of the active element basis on the target value set at the predefined value.

5. The lighting device according to claim 1, wherein, when the second light source block is shifted from a lit condition to an extinguished condition, the switching control circuit increases the target value of the current flowing through the active element over time at a predetermined time constant from a value thereof when the active element is OFF to a value thereof when the active element is ON, and the control unit varies the impedance of the active element as the target value increases.

6. The lighting device according to claim 5, wherein, when the second light source block is shifted from the extinguished condition to the lit condition, the switching control circuit reduces the target value of the current flowing through the active element over time at a predetermined time constant from the value thereof when the active element is ON to the value thereof when the active element is OFF, and the control unit varies the impedance of the active element as the target value decreases.

7. The lighting device according to claim 1, wherein, when the second light source block is shifted from a lit condition to an extinguished condition, the switching control circuit sets the target value of the current flowing through the active element at a predefined value which is larger than a load current flowing through the first light source block when the light source group is lit in a steady state and smaller than a maximum allowable current of the light source group, and the control unit varies the impedance of the active element basis on the target value set at the predefined value.

8. The lighting device according to claim 7, wherein, when the second light source block is shifted from the extinguished condition to the lit condition, the switching control circuit reduces the target value of the current flowing through the active element over time at a predetermined time constant from the value thereof when the active element is ON to the value thereof when the active element is OFF, and the control unit varies the impedance of the active element as the target value decreases.

9. The lighting device according to claim 7, wherein the power supply circuit includes a detection unit that detects a current flowing to the light source group in order to perform constant current control, and the control unit uses the current detected by the detection unit as a detection value, and feedback-controls the current serving as the detection value by controlling the impedance of the active element such that the detection value matches the target value.

10. The lighting device according to claim 1, wherein the light source group is constituted by a plurality of light emitting diodes connected in series.

11. A vehicle headlamp comprising:

the lighting device according to claim 1; and a lamp main body attached to a vehicle.

12. A lighting device comprising:

a power supply circuit that supplies a constant current to a light source group in which a first light source block and a second light source block are connected in series; and a switching circuit that includes an active element connected in parallel to the second light source block, and extinguishes the second light source block by applying a current to the active element such that the current bypasses the second light source block, wherein the active element includes a control terminal, has an impedance that can be varied in accordance with a control signal input into the control terminal, and lights the second light source block when the impedance reaches or exceeds a predetermined value, and the switching circuit includes:

a control unit that controls the impedance of the active element such that a current flowing through the active element or an end-to-end voltage of the active element matches a target value; and a switching control circuit that sets the target value, wherein, when the second light source block is shifted from a lit condition to an extinguished condition, the switching control circuit reduces an absolute value of the target value of the end-to-end voltage of the active element over time at a predetermined time constant from a value thereof when the active element is OFF to a value thereof when the active element is ON, and the control unit varies the impedance of the active element as the absolute value of the target value decreases.

13. The lighting device according to claim 12, wherein, the control unit detects the current flowing through the active element or the end-to-end voltage of the active element as a detection value, and feedback-controls the current or the end-to-end voltage serving as the detection value by controlling the impedance of the active element such that the detection value matches the target value.

14. The lighting device according to claim 13, wherein, when a capacitance of capacitor connected in parallel between an output stage of the power supply circuit and the light source group is set as C, the end-to-end voltage of the active element when the active element is OFF is set as V0, and a load current flowing to the light source group is set as I0, the switching control circuit reduces the absolute value of the target value from the value thereof when the active element is OFF to the value thereof when the active element is ON over a period of at least $C \times V0/I0$.

15. The lighting device according to claim 12, wherein, when a capacitance of capacitor connected in parallel between an output stage of the power supply circuit and the light source group is set as C, the end-to-end voltage of the active element when the active element is OFF is set as V0, and a load current flowing to the light source group is set as I0, the switching control circuit reduces the absolute value of the target value from the value thereof when the active element is OFF to the value thereof when the active element is ON over a period of at least $C \times V0/I0$.

16. The lighting device according to claim 15, wherein, when the second light source block is shifted from the extinguished condition to the lit condition, the switching control circuit increases the absolute value of the target value over time at a predetermined time constant from the value thereof when the active element is ON to the value thereof when the active element is OFF, and the control unit varies the impedance of the active element as the absolute value of the target value increases.

17. The lighting device according to claim 12, wherein, when the second light source block is shifted from the extinguished condition to the lit condition, the switching control circuit increases the absolute value of the target value over time at a predetermined time constant from the value thereof when the active element is ON to the value thereof when the active element is OFF, and the control unit varies the impedance of the active element as the absolute value of the target value increases.

18. A vehicle headlamp comprising:

the lighting device according to claim 12; and a lamp main body attached to a vehicle.

19. A lighting device comprising:

a power supply circuit that supplies a constant current to a light source group in which a first light source block and a second light source block are connected in series; and a switching circuit that includes an active element connected in parallel to the second light source block, and extinguishes the second light source block by applying a current to the active element such that the current bypasses the second light source block, wherein the active element includes a control terminal, has an impedance that can be varied in accordance with a control signal input into the control terminal, and lights the second light source block when the impedance reaches or exceeds a predetermined value, and the switching circuit includes:

a control unit that controls the impedance of the active element such that a current flowing through the active element or an end-to-end voltage of the active element matches a target value; and a switching control circuit that sets the target value, wherein the power supply circuit includes an overvoltage control unit that monitors an output voltage of the power supply circuit and limits the output voltage to or below an upper limit value, which is larger than a maximum value when the light source group is lit in a steady state, and the switching circuit switches the upper limit value in response to a switch in the second light source block between the lit condition and the extinguished condition.

20. A vehicle headlamp comprising:

the lighting device according to claim 19; and a lamp main body attached to a vehicle.

* * * * *